United States Patent
Abruña et al.

(10) Patent No.: US 11,417,884 B2
(45) Date of Patent: Aug. 16, 2022

(54) TITANIUM DISULFIDE-SULFUR COMPOSITES

(71) Applicants: CORNELL UNIVERSITY, Ithaca, NY (US); WUHAN UNIVERSITY, Wuhan (CN)

(72) Inventors: Héctor D. Abruña, Ithaca, NY (US); Yao Yang, Ithaca, NY (US); Fu-Sheng Ke, Wuhan (CN); Xiao-Chen Liu, Wuhan (CN)

(73) Assignees: CORNELL UNIVERSITY, Ithaca, NY (US); WUHAN UNIVERSITY, Wuhan (CN)

( * ) Notice: Subject to any disclaimer, the term of this patent is extended or adjusted under 35 U.S.C. 154(b) by 247 days.

(21) Appl. No.: 16/771,776

(22) PCT Filed: Dec. 20, 2018

(86) PCT No.: PCT/US2018/066797
§ 371 (c)(1),
(2) Date: Jun. 11, 2020

(87) PCT Pub. No.: WO2019/126499
PCT Pub. Date: Jun. 27, 2019

(65) Prior Publication Data
US 2021/0194004 A1  Jun. 24, 2021

Related U.S. Application Data

(60) Provisional application No. 62/608,230, filed on Dec. 20, 2017.

(51) Int. Cl.
*H01M 4/00* (2006.01)
*H01M 4/58* (2010.01)
(Continued)

(52) U.S. Cl.
CPC ....... *H01M 4/5815* (2013.01); *H01M 4/0404* (2013.01); *H01M 4/366* (2013.01);
(Continued)

(58) Field of Classification Search
CPC ............... H01M 4/366; H01M 4/1391; H01M 2004/028; H01M 4/134; H01M 4/0404; H01M 4/622; Y02E 60/10
See application file for complete search history.

(56) References Cited

U.S. PATENT DOCUMENTS

| | | | |
|---|---|---|---|
| 4,007,055 A | 2/1977 | Whittingham | |
| 4,233,377 A | 11/1980 | Haering et al. | |

(Continued)

FOREIGN PATENT DOCUMENTS

| | | |
|---|---|---|
| CN | 106935796 A | 7/2017 |
| EP | 3203567 A1 | 8/2017 |

(Continued)

OTHER PUBLICATIONS

International Search Report and Written Opinion of the International Searching Authority for International Application No. PCT/US2018/066797 dated Mar. 28, 2019.

(Continued)

*Primary Examiner* — Cynthia H Kelly
*Assistant Examiner* — Monique M Wills
(74) *Attorney, Agent, or Firm* — Heslin Rothenberg Farley & Mesiti P C.

(57) ABSTRACT

A titanium disulfide-sulfur ($TiS_2$—S) composite particle contains a titanium disulfide ($TiS_2$) substrate having solid elemental sulfur (S) disposed directly on a surface of the $TiS_2$. The $TiS_2$ substrate has a layered crystalline hexagonal structure of space group P-3 m1 and includes at least 100 distinct layers. The $TiS_2$ and S are present in the composite in a weight ratio ($TiS_2$:S) of 20:80 to 50:50. Cathodes and (Continued)

batteries containing the composite particle, as well as related methods, are also disclosed.

20 Claims, 21 Drawing Sheets

(51) Int. Cl.
  *H01M 4/04* (2006.01)
  *H01M 4/36* (2006.01)
  *H01M 4/38* (2006.01)
  *H01M 4/62* (2006.01)
  *H01M 10/0525* (2010.01)
  *H01M 4/02* (2006.01)

(52) U.S. Cl.
  CPC .............. *H01M 4/38* (2013.01); *H01M 4/622* (2013.01); *H01M 4/625* (2013.01); *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 4,772,457 | A | 9/1988 | Panster et al. |
| 6,210,832 | B1 * | 4/2001 | Visco .................... H01M 4/62 429/231.95 |
| 2004/0101753 | A1 | 5/2004 | Hwang |
| 2013/0017418 | A1 | 1/2013 | Garsuch et al. |
| 2015/0044556 | A1 | 2/2015 | Wang et al. |
| 2016/0204466 | A1 | 7/2016 | Nogami et al. |
| 2018/0123134 | A1 | 5/2018 | Gan et al. |
| 2018/0301694 | A1 | 10/2018 | Sung et al. |

FOREIGN PATENT DOCUMENTS

| | | |
|---|---|---|
| GB | 1468416 | 3/1977 |
| GB | 1599792 | 10/1981 |
| WO | 2013/008166 A1 | 1/2013 |
| WO | 2016/193216 A1 | 12/2016 |
| WO | 2017/113234 A1 | 7/2017 |

OTHER PUBLICATIONS

Garsuch, A., et al., "Performance of Blended $TiS_2$/Sulfur/Carbon Cathodes in Lithium-Sulfur Cells", ECS Electrochemistry Letters, vol. 1, No. 1, pp. A24–A26 (2012).

Gordin, M.L., "Surface Control in Pursuit of Next-Generation Batteries", Doctoral Thesis, The Pennsylvania State University, pp. 1-143 (2015).

Liu, X-C., et al., "Dynamic Hosts for High-Performance Li—S Batteries Studied by Cryogenic Transmission Electron Microscopy and in Situ X-ray Diffraction", ACS Energy Letters, DOI: 10.1021 (2018).

Margolin, A., et al., "Inorganic fullerene-like nanoparticles of $TiS_2$" Chemical Physics Letters, vol. 411, pp. 162-166 (2005).

Sun, X., et al., "Layered $TiS_2$ Positive Electrode for Mg Batteries", ACS Energy Letters, vol. 1, pp. 297-301 (2016).

Whittingham, M.S., et al., "Formation of Stoichiometric Titanium Disulfide", Mat. Res. Bull., vol. 16, pp. 37-45 (1981).

Zhang, Q., et al., "Probing Titanium Disulfide-Sulfur Composite Materials for Li—S Batteries via In-situ X-ray Diffraction (XRD) Technique", Brookhaven National Laboratory, BNL-114106-2017-JA.

Zhou, G., et al., "Catalytic oxidation of $Li_2S$ on the surface of metal sulfides for Li—S batteries", PNAS, vol. 114, No. 5, pp. 840-845 (2017).

Sun, W., et al., "Water in Salt electrolyte enabled $LiMn_2O_4$/$TiS_2$ Lithium-ion batteries", Electrochemistry Communications, vol. 82, pp. 71-74 (2017).

* cited by examiner

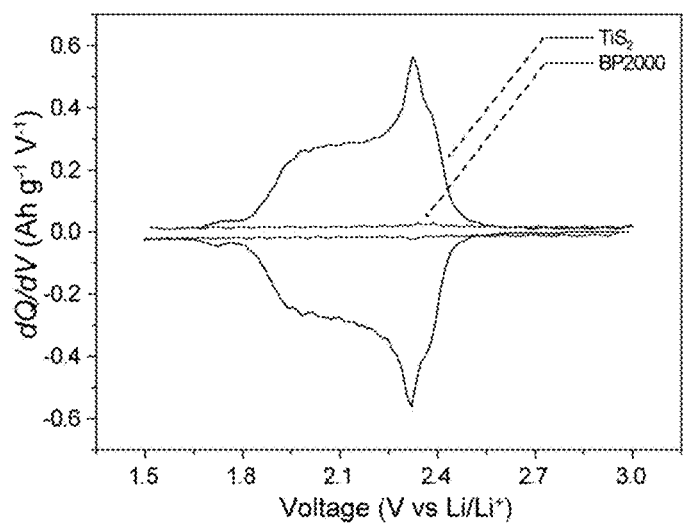
FIG. 12
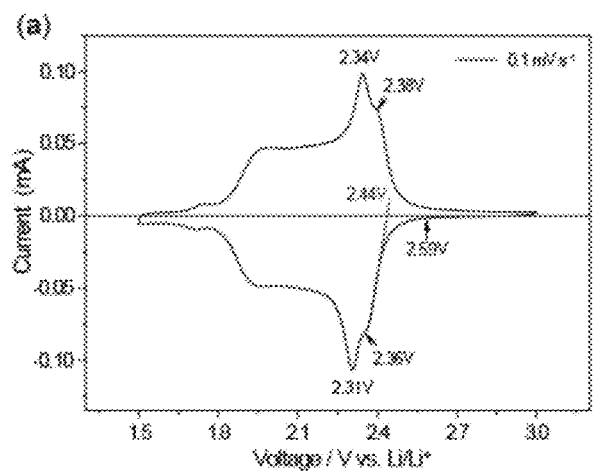 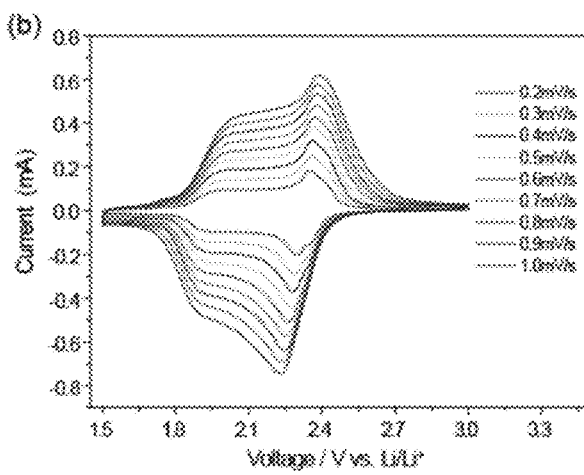
FIG. 13A  FIG. 13B

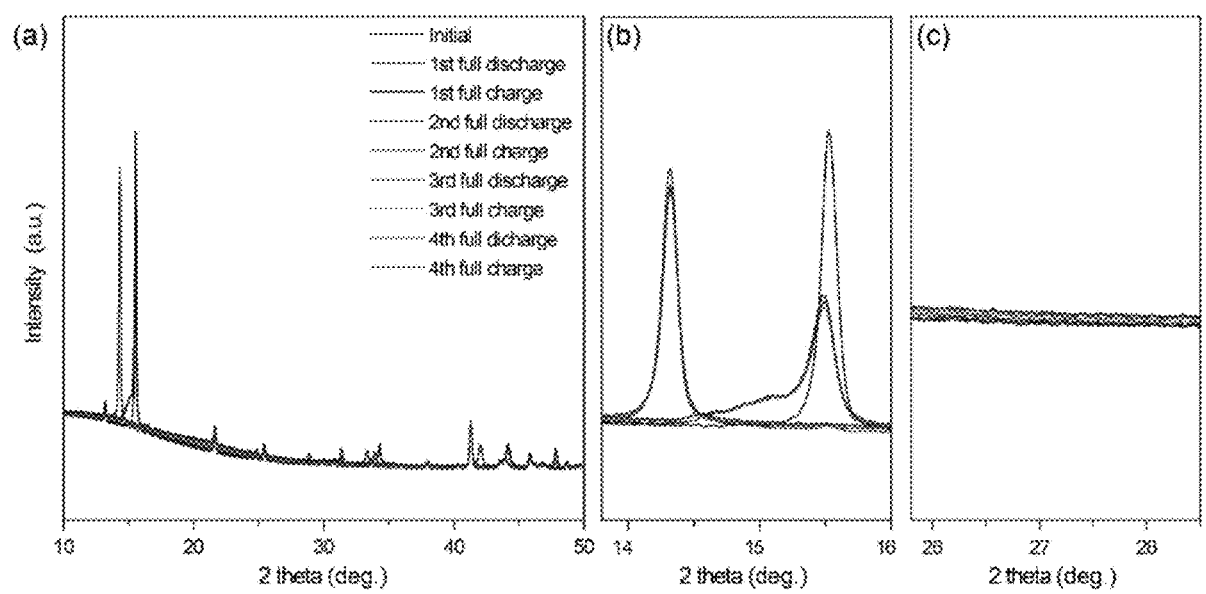
FIG. 16A  FIG. 16B  FIG. 16C

US 11,417,884 B2

TITANIUM DISULFIDE-SULFUR COMPOSITES

CROSS-REFERENCE TO RELATED APPLICATIONS

This application is a U.S. national phase entry under Section 371 of International Application No. PCT/US2018/066797, filed on Dec. 20, 2018, which published as WO 2019/126499 A1, which claims priority to U.S. Provisional Patent Application No. 62/608,230, filed Dec. 20, 2017. The entire contents of each of the prior applications are hereby incorporated by reference herein.

STATEMENT OF GOVERNMENT INTEREST

This invention was made with government support under DE-SC0001086 awarded by the United States Department of Energy and under DMR-1719875 awarded by the United States National Science Foundation Materials Research Science and Engineering Center (MRSEC). The United States Government has certain rights in the invention.

FIELD OF THE INVENTION

This invention relates to new titanium disulfide-sulfur ($TiS_2$—S) composites, as well as to cathodes and batteries (e.g., Li—S batteries) comprising the composites, and related methods and processes. The composites are conducive toward use in an improved cathode, e.g., for an Li—S battery.

BACKGROUND

The demand for high-energy density batteries is increasing rapidly as there is a need for reliable and cost-effective energy storage in both mobile and stationary electrical energy-storage technologies. Metal sulfur batteries are one of the most promising platforms for meeting these needs because of the high theoretical specific capacity of the sulfur cathode (1675 mAhg), which is about eight times the typical value for the most promising intercalating cathodes (e.g. 200 mAhG for $LiNi_{0.8}Co_{0.15}Al_{0.05}O_2$ (NCA)) in use within today's lithium-ion batteries (LIBs). In particular, lithium-sulfur (Li—S) batteries are a promising technology because of their high theoretical energy density and low cost. When paired with a lithium metal anode, which also boasts more than a 10-fold improvement in theoretical specific capacity (3800 mAhG) relative to the graphitic carbon anode (372 mAhG) generally used in LIBs, the sulfur cathode becomes legitimately one of the most important conversion cathodes, because it enables a battery technology with exceptional specific energy per unit mass (2600 Whkg) or per unit volume (2800 WhL). However, problems relative to Li—S batteries remain, including those relating to cycle life and efficiency.

Thus, a need exists for improved Li—S batteries and compositions that are conducive to improved cell performance.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

In this specification, where a document, act or item of knowledge is referred to or discussed, this reference or discussion is not an admission that the document, act or item of knowledge or any combination thereof was, at the priority date, publicly available, known to the public, part of common general knowledge, or otherwise constitutes prior art under the applicable statutory provisions; or is known to be relevant to an attempt to solve any problem with which this specification is concerned.

SUMMARY OF THE INVENTION

Briefly, the present invention satisfies the need for, inter alfa, new composites that are conducive toward use in an improved Li—S battery.

The invention provides new titanium disulfide-sulfur ($TiS_2$—S) composites, as well as cathodes and batteries (e.g., Li—S batteries) comprising the composites, and related methods and processes. As described herein, Applicants have discovered a $TiS_2$ material that is a promising sulfur host for Li—S batteries. Embodiments of cathodes comprising embodiments of the inventive titanium disulfide-sulfur ($TiS_2$—S) composites demonstrate favorable electrochemical performance, including improved capacity, improved capacity retention and/or improved coulombic efficiency.

Embodiments of the invention may address one or more of the problems and deficiencies discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

Certain embodiments of the presently-disclosed $TiS_2$—S composites and related methods and articles/devices have several features, no single one of which is solely responsible for their desirable attributes. Without limiting the scope of the $TiS_2$—S composites and related methods and articles/devices as defined by the claims that follow, their more prominent features will now be discussed briefly. After considering this discussion, and particularly after reading the section of this specification entitled "Detailed Description of the Invention," one will understand how the features of the various embodiments disclosed herein provide a number of advantages over the current state of the art. These advantages may include, without limitation, providing $TiS_2$—S composite embodiments having enhanced electrochemical properties, which, when employed in a cathode (e.g., for a Li—S battery) provide exceptional capacity retention.

In a first aspect, the invention provides a titanium disulfide-sulfur ($TiS_2$—S) composite particle comprising a titanium disulfide ($TiS_2$) substrate having solid elemental sulfur (S) disposed directly on a surface of the $TiS_2$, wherein the $TiS_2$ substrate has a layered crystalline hexagonal structure of space group P-3 ml and comprises at least 100 distinct layers, and wherein the $TiS_2$ and S are present in the composite in a weight ratio ($TiS_2$:S) of 20:80 to 50:50.

In a second aspect, the invention provides a cathode comprising the $TiS_2$—S composite particle according to the first aspect of the invention.

In a third aspect, the invention provides a lithium-sulfur (Li—S) battery comprising: an anode; a cathode according to the second aspect of the invention; and a separator, wherein the separator is positioned between the anode and the cathode.

In a fourth aspect, the invention provides a process for manufacturing the cathode according to the second aspect of the invention, comprising mixing $TiS_2$—S composite particles, carbon black, and binder in solvent to form a slurry, applying the slurry to a current collector, and drying the slurry to form the coating.

These and other objects, features, and advantages of this invention will become apparent from the following detailed description of the various aspects of the invention taken in conjunction with the accompanying drawings.

BRIEF DESCRIPTION OF THE DRAWINGS

The present invention will hereinafter be described in conjunction with the following drawing figures. The depicted figures serve to illustrate various embodiments of the invention. However, the invention is not limited to the precise arrangements and instrumentalities of the embodiments in the drawings.

FIG. 8C shows rate capability and FIG. 8D shows stabilized discharge/charge voltage profiles of the $TiS_2$-60S electrode at different C rates.

FIG. 8E depicts plots of specific capacity versus cycle number for a $TiS_2$-60S electrode at 1.0 C (the first 10 cycles were run at 0.1 C, corresponding to an activation process).

FIG. 9A—plots of specific capacity versus cycle number of a $TiS_2$-60S electrode during 480 cycles; FIG. 9B—selected voltage profiles of Ti22-60S; and FIG. 9C—BP2000-605composites electrodes at a rate of 0.3 C.

FIG. 12 shows differential capacity plots of $TiS_2$ and BP2000 electrodes for the stabilized cycles in FIG. 10.

FIGS. 13A-B depicts cyclic voltammograms of a $TiS_2$ electrode with scanning rate of (13A) 0.1 mV $s^{-1}$ and (13B) 0.2-1.0 mV $s^{-1}$.

FIGS. 16A-C show selected in situ XRD patterns of $TiS_2$ electrode during cycling at (16A) 2θ=10.0-50.0°, (16B) 2θ=13.8-16.0°, and (16C) 2θ=25.8-28.5°.

DETAILED DESCRIPTION OF THE INVENTION

Figures 1A, 1B:
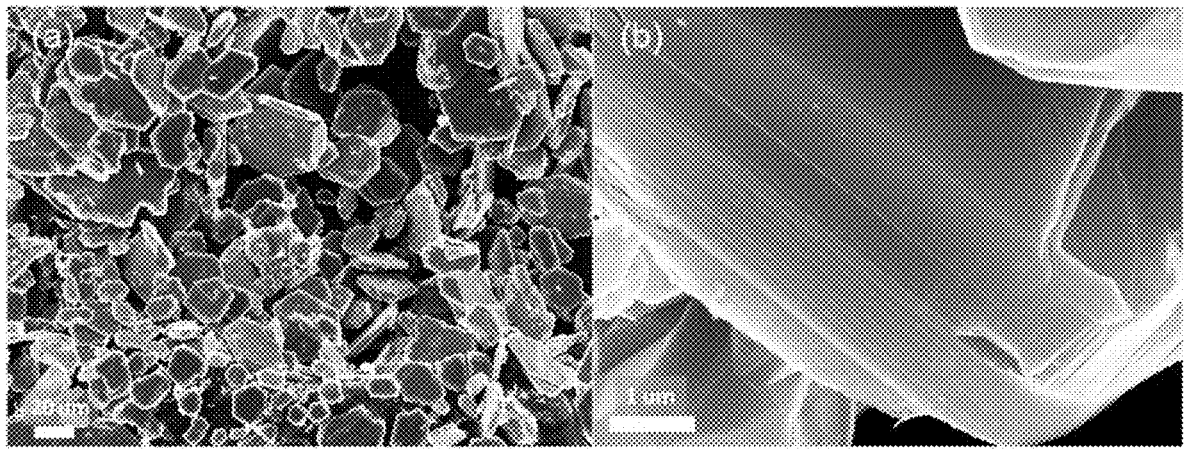
FIGS. 1A and 1B are SEM images of embodiments of as-synthesized $TiS_2$ substrate particles according to the invention (1A) and its corresponding high magnification (1B).

The present invention relates to, inter alfa, a new $TiS_2$—S composite, a cathode comprising the $TiS_2$—S composite, a Li—S battery comprising the $TiS_2$—S composite, and related methods and processes (e.g., methods of preparing the $TiS_2$—S composite, cathode, or battery).

Aspects of the present invention and certain features, advantages, and details thereof are explained more fully below with reference to the non-limiting embodiments discussed and illustrated in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and not by way of limitation. Various substitutions, modifications, additions and/or arrangements within the spirit and/or scope of the underlying inventive concepts will be apparent to those skilled in the art from this disclosure.

Limitations for commercializing Li—S batteries include: (1) poor electronic conductivity of sulfur and its discharge products; (2) easy dissolution of intermediate lithium polysulfides (LiPSs) in the electrolyte, which results in LiPSs shuttling between cathode and anode and resultant deposition of sulfide on the anode; (3) large volumetric changes during electrochemical cycling (charging/discharging), leading to instability and irreversibility of the electrode. In the recent past, there has been an increase in research efforts geared at overcoming these challenges. A common strategy has been to immobilize the sulfur and LiPSs in various host materials including carbons, metal oxides, polymers, MXenes, metal sulfides, metal organic frameworks, and covalent organic frameworks. There is a critical, but often neglected, phenomenon that some hosts themselves can be lithiated/delithiated during the cycling process. Therefore, there is growing interest in assessing whether or not an intermediate of a lithiated host can trap LiPSs during the discharge process and catalytically decompose $Li_2S$ in the charge process.

Applicants have extensively explored the dynamic variations of a sulfur host, $TiS_2$, including by in situ X-ray diffraction (XRD) and cryogenic scanning transmission electron microscopy (cryo-STEM), and have found that lithium ions first react with $TiS_2$ to form $Li_xTiS_2$ ($0<x<1$) and subsequently, LiPSs are formed. As a result, LiPSs are likely adsorbed on the surface of $Li_xTiS_2$, not $TiS_2$, during the discharge process. During the charging process, the discharge product of $LiTiS_2$ is converted to $Li_xTiS_2$ ($0<x<1$), not $TiS_2$. Therefore, without being bound by theory, it seems that it is the $Li_xTiS2$ ($0<X\leq1$) that catalytically decomposes $Li_2S$. Density functional theory (DFT) calculations suggest that $Li_xTiS_2$ ($0<x\leq1$) exhibits strong binding/anchoring interactions towards LiPSs with adsorption energies of 0.6-3.5 eV, depending on the Li composition. As discussed herein, Applicants have discovered that particularities regarding $TiS_2$—S composites (and the $TiS_2$ used in the composites) have significant effects on the electrochemical performance of Li—S cells employing them. Embodiments of the $TiS_2$—S composites disclosed herein are distinguishable from prior art compositions in terms of both their structure and properties.

US 20040101753 discloses a positive electrode for a Li—S battery that includes a positive active material (selected from elemental sulfur ($S_8$), a sulfur-based compound, and mixtures thereof), a conductive material, a binder, and an inorganic additive (selected from a metal oxide, a metal sulfide, such as $TiS_2$, or a mixture thereof) with a particle size of 5,000 nm or less. The object of the invention is to control the roughness of the surface of the cathode by using the inorganic additive having the indicated particle size. The reference does not disclose a $TiS_2$—S composite. On the contrary, the reference cathode is prepared by mixing the positive active material, conductive material, binder, and inventive inorganic additive in a solvent to prepare a slurry that is coated on a current collector.

WO 2013008166 discloses an electrode material that comprises (A) at least one ion-and electron-conductive metal chalcogenide (e.g., $TiS_2$); (B) carbon in a polymorph comprising at least 60% $sp^2$-hybridized carbon atoms; (C) at least one sulfur-containing component selected from the group consisting of elemental sulfur, a composite produced from elemental sulfur and at least one polymer, a polymer comprising divalent di- or polysulfide bridges and mixtures thereof; and (D) optionally at least one binder. The reference components (A)-(D) can be in a homogenous mixture or can have a layered structure. The reference does not disclose a $TiS_2$—S composite.

Zhou et al., PNAS Jan. 31, 2017 114 (5) 840-845, discusses catalytic oxidation ofm $Li_2S$ on the surface of metal sulfides for Li—S batteries. In the reference, sulfur was infused into six metal sulfide/graphene/carbon nanotube ($M_xS_y$@GCNT, $M_xS_y$:GCNT=1:1 mass ratio) hybrids to form six S-$M_xS_y$@GCNT composites, including S—$TiS_2$@GCNT. Commercially available metal sulfide ($M_xS_y$) particles were used to form the composites. Of the six composites, the S—$VS_2$@GCNT composite had by far the best cycling performance, followed by the S—$CoS_2$@GCNT composite then the S—$TiS_2$@GCNT composite. Cycling performance of the S—$TiS_2$ @GCNT electrode at 0.5 C for 300 cycles demonstrated an initial reversible capacity of 698.2 mAh $g^-$, and the capacity remained at 546 mAh $g^{-1}$ after 300 cycles, with a capacity retention of 78.2% and an average capacity decay rate of 0.073% per cycle. This performance is inferior to that of embodiments of the inventive composite by virtue of, inter alfa, the better-defined structure of the $TiS_2$ in the inventive composite. As discussed herein, Applicants have developed a structurally well-defined, layered $TiS_2$ material that allows for unexpectedly better electrochemical performance than commercially available $TiS_2$.

The inventive $TiS_2$—S composite and the improved electrochemical performance achieved using embodiments of the inventive $TiS_2$—S composite are not disclosed, contemplated, or expected in view of the prior art.

In a first aspect, the invention provides a titanium disulfide-sulfur ($TiS_2$—S) composite comprising a titanium disulfide ($TiS_2$) substrate having solid elemental sulfur (S) disposed directly on a surface of the $TiS_2$, wherein the $TiS_2$ substrate has a layered crystalline hexagonal structure of space group P-3 ml and comprises at least 100 distinct layers, and wherein the $TiS_2$ and S are present in the composite in a weight ratio ($TiS_2$:S) of 20:80 to 50:50.

The $TiS_2$—S composite is a material wherein sulfur is disposed directly (e.g., is melt infused) on a $TiS_2$ substrate, so as to form, without need of binder, a single discernible structure (e.g., particle) that comprises both the $TiS_2$ and sulfur. The $TiS_2$ composite is distinguishable from compositions that comprise both $TiS_2$ and sulfur, but wherein the sulfur is not disposed directly on a surface of the $TiS_2$. For example, where $TiS_2$ and sulfur are merely mixed (e.g., in a slurry), and applied to a substrate (such as a current collector), sulfur may be in contact with $TiS_2$, but it is not considered to be disposed directly on a surface of the $TiS_2$. On the contrary, as used herein, the statement that sulfur is disposed directly on a surface of the $TiS_2$ refers to the sulfur and $TiS_2$ being a unitary, discrete entity (e.g., particle). When mechanically mixed with other constituents (e.g., carbon, binder, etc.), the $TiS_2$ and sulfur comprised within the $TiS_2$—S composite are inseparable, as they together form a discrete entity.

In some embodiments, the $TiS_2$—S composite is in the form of a particle.

In some embodiments, the $TiS_2$—S composite consists of $TiS_2$ and elemental sulfur.

Figure 1C:
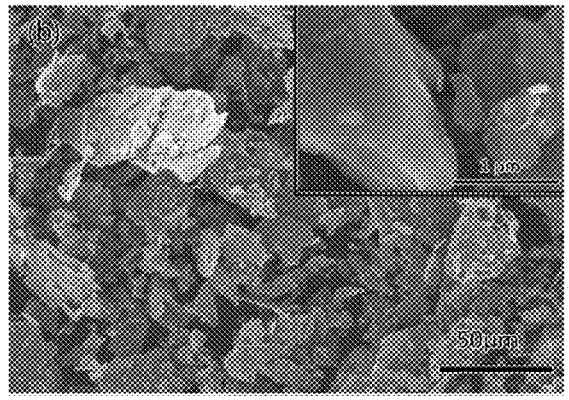
FIG. 1C is a SEM image of commercially-available $TiS_2$.

The $TiS_2$ substrate has a layered crystalline hexagonal structure of space group P-3 ml and comprises at least 100 distinct layers. Embodiments of the $TiS_2$ substrate are structurally distinct from embodiments of commercially available $TiS_2$ in that they have fewer defects. FIGS. 1A and 1B are SEM images of embodiments of $TiS_2$ according to the invention. FIG. 1C is a SEM image of commercially-available $TiS_2$ purchased from Sigma-Aldrich (disclosed in Sun et al., Electrochemistry Communications 82 (2017) 71-74). As is readily apparent following a comparison between FIGS. 1A-B vs. FIG. 1C, the inventive embodiments of $TiS_2$ have a much better-defined crystalline layered structure than the prior art $TiS_2$. While the prior art $TiS_2$ has many readily apparent defects, the inventive $TiS_2$ embodiments have more distinct layers and sharp edges, as compared to the unclear and defect-ridden edges in the prior art. The better crystalized $TiS_2$ used in embodiments of the invention provides more parallel channels with less crystal defects for faster $Li^+$ intercalation, thereby providing for better battery performance, as evidenced by the electrochemical data presented herein. The structure of the $TiS_2$ when in intimate contact with the sulfur disposed thereon, as described herein, results in embodiments of $TiS_2$—S composites that provide for long-term cycling stability with high capacity retention, both of which are imperative to the success of a Li—S battery.

Non-limiting examples of $TiS_2$ substrate formation are described in the examples below. In some embodiments, the $TiS_2$ substrate is formed via a synthesis adopted from Whittingham et al., Mat. Res. Bull., Vol. 16, pp. 37-45, 1981, which cites U.S. Pat. No. 4,007,055 to Whittingham. U.S. Pat. No. 4,007,055 discloses a preparation method for making $TiS_2$. The reference teaches forming $TiS_2$ at a reaction temperature between about 475° C. and 600° C. Use of higher temperatures is dissuaded because of, inter alia, resultant control problems in minimizing crystal growth or the production of titanium trisulfide, formation of large particle sizes that are undesirable for battery applications, and increased crystalline imperfections. However, Applicants have found that syntheses of embodiments of $TiS_2$ at higher temperatures in excess of 600° C. result in $TiS_2$ having a better defined crystal structure with fewer defects.

In some embodiments, the $TiS_2$ substrate is formed via synthesis at a temperature greater than 600° C. (e.g., greater than 610, 620, 630, 640, 650, 660, 670, 680, 690, 700, 710, 720, 730, 740, 750, 760, 770, 780, 790, 800, 810, 820, 830, or 840° C.).

In some embodiments, the $TiS_2$ substrate is formed via synthesis at a temperature of 475° C. to 950° C. (e.g., at 475, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, or 900° C.), including any and all ranges and subranges therein (e.g., at 610 to 900° C., 610 to 870° C., etc.).

In some embodiments, the $TiS_2$ substrate has clear, visible layers based on SEM, as shown for the $TiS_2$ particle embodiment in FIG. 1B.

In some embodiments, the $TiS_2$ substrate comprises at least 100 distinct layers (e.g., at least 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, 1490, 1500, 1510, 1520, 1530, 1540, 1550, 1560, 1570, 1580, 1590, 1600, 1610, 1620, 1630, 1640, 1650, 1660, 1670, 1680, 1690, 1700, 1710, 1720, 1730, 1740, 1750, 1760, 1770, 1780, 1790, 1800, 1810, 1820, 1830, 1840, 1850, 1860, 1870, 1880, 1890, 1900, 1910, 1920, 1930, 1940, 1950, 1960, 1970, 1980, 1990, 2000, 2100, 2200, 2300, 2400, 2500, 2600, 2700, 2800, 2900, 3000, 3100, 3200, 3300, 3400, 3500, 3600, 3700, 3800, 3900, 4000, 4100, 4200, 4300, 4400, 4500, 4600, 4700, 4800, 4900, 5000, 5100, 5200, 5300, 5400, 5500, 5600, 5700, 5800, 5900, or 6000 layers).

In some embodiments, at least 50% of the layers present in the $TiS_2$ substrate (e.g., at least 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99% of the layers present) have a surface area of at least 10 $\mu m^2$ (e.g., at least 10, 20, 30, 40, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, or 1000 $\mu m^2$).

In some embodiments, the layers in the $TiS_2$ substrate have a thickness of 0.25 to 0.75 nm (e.g., 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, or 0.75 nm), including any and all ranges and subranges therein (e.g., 0.3 to 0.7 nm, 0.4 to 0.6 nm, etc.)

In some embodiments, the $TiS_2$ substrate has a crystal lattice having less than a total of 3 vol % defects (e.g., point defects, line defects, and/or surface defects) therein based on the total volume of the substrate (e.g., less than 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, 0.30, 0.31, 0.32, 0.33, 0.34, 0.35, 0.36, 0.37, 0.38, 0.39, 0.40, 0.41, 0.42, 0.43, 0.44, 0.45, 0.46, 0.47, 0.48, 0.49, 0.50, 0.51, 0.52, 0.53, 0.54, 0.55, 0.56, 0.57, 0.58, 0.59, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1.0, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19, 1.20, 1.21, 1.22, 1.23, 1.24, 1.25, 1.26, 1.27, 1.28, 1.29, 1.30, 1.31, 1.32, 1.33, 1.34, 1.35, 1.36, 1.37, 1.38, 1.39, 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59, 1.60, 1.61, 1.62, 1.63, 1.64, 1.65, 1.66, 1.67, 1.68, 1.69, 1.70, 1.71, 1.72, 1.73, 1.74, 1.75, 1.76, 1.77, 1.78, 1.79, 1.80, 1.81, 1.82, 1.83, 1.84, 1.85, 1.86, 1.87, 1.88, 1.89, 1.90, 1.91, 1.92, 1.93, 1.94, 1.95, 1.96, 1.97, 1.98, 1.99, 2.0, 2.1, 2.2, 2.3, 2.4, 2.5, 2.6, 2.7, 2.8, 2.9, or 3.0 vol %).

In the inventive $TiS_2$—S composite, the $TiS_2$ and S are present in a weight ratio ($TiS_2$:S) of 20:80 to 50:50. Thus, the $TiS_2$—S composite comprises 20-50 wt % $TiS_2$ (e.g., 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt % $TiS_2$), including any and all ranges and subranges therein (e.g., 30-50 wt %). The $TiS_2$—S composite comprises 50-80 wt % sulfur (e.g., 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 wt %), including any and all ranges and subranges therein (e.g., 40-70 wt %).

In some embodiments of the inventive $TiS_2$—S composite particle, the sulfur disposed directly on a surface of the $TiS_2$ is in the form of particles having an average particle size of 2 to 5 $\mu m$ (e.g., 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 $\mu m$), including any and all ranges and subranges therein.

In some embodiments, the $TiS_2$—S composite particle is free of binder.

In some embodiments of the $TiS_2$—S composite particle, less than 5 wt % of elemental sulfur (e.g., less than 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, or 5.0 wt %) (based on total weight of elemental sulfur present in the composite particle) is infiltrated in the layers of $TiS_2$. In some embodiments, no elemental sulfur is infiltrated in the layers of $TiS_2$.

In some embodiments, the TiS$_2$—S composite particle has a particle size of 2 μm to 100 μm (e.g., 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 μm), including any and all ranges and subranges therein (e.g., 6 to 50 μm, 6 to 40 μm, 6 to 30 μm, etc.).

In some embodiments, the TiS$_2$—S composite particle has a thickness of 2 μm to 10 μm (e.g., 2, 3, 4, 5, 6, 7, 8, 9, or 10 μm), including any and all ranges and subranges therein (e.g., 2 to 7 μm, etc.).

In some embodiments, the invention provides a plurality of TiS$_2$—S composite particles.

In some embodiments, at least 70% (e.g., at least 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 99.5%) of the particles in the plurality of TiS$_2$—S composite particles are composite particles according to inventive embodiments. In some embodiments all (100%) of the particles in the plurality of TiS$_2$—S composite particles are composite particles according to inventive embodiments.

In some embodiments, the invention provides a plurality of TiS$_2$—S composite particles having an average particle size of 6 μm to 50 μm (e.g., 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 μm), including any and all ranges and subranges therein (e.g., 6 to 40 μm).

In some embodiments, the invention provides a plurality of TiS$_2$—S composite particles having an average particle size of greater than or equal to 6 μm (e.g., greater than or equal to 6, 7, 8, 9, 10, 11, 12, 13, 14, 15, 16, 17, 18, 19, or 20 μm).

In some embodiments, the invention provides a plurality of TiS$_2$—S composite particles wherein at least 75% of the particles (e.g., at least 75, 76, 77, 78, 79, 80, 81, 82, 83, 84, 85, 86, 87, 88, 89, 90, 91, 92, 93, 94, 95, 96, 97, 98, or 99%) have a particle size equal to the average particle size of all TiS$_2$—S particles present ($\bar{x}$)±0 to 30 μm (e.g., 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 μm), including any and all ranges and subranges therein (e.g., $\bar{x}$±5 to 25 μm, etc.).

In a second aspect, the invention provides a cathode comprising the TiS$_2$—S composite particle according to the first aspect of the invention.

In some embodiments, the cathode is a cathode for a Li—S cell or Li—S battery.

In some embodiments, the cathode comprises a plurality of TiS$_2$—S composite particles according to the first aspect of the invention, carbon, and optionally binder.

In some embodiments, the carbon is selected from graphite, carbon black, carbon nanotubes, carbon nanofibers, graphene, doped carbon (e.g., carbon doped with a heteroatom, such as one or more of nitrogen, oxygen, boron, phosphorous, and sulfur), and mixtures thereof.

In some embodiments, the cathode comprises a coating on a current collector, wherein the coating comprises, based on total weight of the coating:

(A) 60 to 80 wt % of a plurality of TiS$_2$—S composite particles (e.g., 60, 61, 62, 63, 64, 65, 66, 67, 68, 69, 70, 71, 72, 73, 74, 75, 76, 77, 78, 79, or 80 wt %), including any and all ranges and subranges therein (e.g., 65 to 75 wt %);

(B) 5 to 40 wt % carbon (e.g., 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %), including any and all ranges and subranges therein (e.g., 15 to 30 wt %); and (C) 2 to 20 wt % binder (e.g., 2, 3, 4, 5, 6, 7, 8, 9, 10, 11, 12, 13, 14, 15, 16, 17, 18, 19, or 20 wt %), including any and all ranges and subranges therein (e.g., 5 to 15 wt %).

In some embodiments, the total weight percent of (A)+(B)+(C) is greater than or equal to 90 wt % of the total weight of the coating (e.g., greater than or equal to 90.0, 90.1, 90.2, 90.3, 90.4, 90.5, 90.6, 90.7, 90.8, 90.9, 91.0, 91.1, 91.2, 91.3, 91.4, 91.5, 91.6, 91.7, 91.8, 91.9, 92.0, 92.1, 92.2, 92.3, 92.4, 92.5, 92.6, 92.7, 92.8, 92.9, 93.0, 93.1, 93.2, 93.3, 93.4, 93.5, 93.6, 93.7, 93.8, 93.9, 94.0, 94.1, 94.2, 94.3, 94.4, 94.5, 94.6, 94.7, 94.8, 94.9, 95.0, 95.1, 95.2, 95.3, 95.4, 95.5, 95.6, 95.7, 95.8, 95.9, 96.0, 96.1, 96.2, 96.3, 96.4, 96.5, 96.6, 96.7, 96.8, 96.9, 97.0, 97.1, 97.2, 97.3, 97.4, 97.5, 97.6, 97.7, 97.8, 97.9, 98.0, 98.1, 98.2, 98.3, 98.4, 98.5, 98.6, 98.7, 98.8, 98.9, 99.0, 99.1, 99.2, 99.3, 99.4, 99.5, 99.6, 99.7, 99.8, or 99.9 wt % of the total weight of the coating). In some embodiments, the total weight percent of (A)+(B)+(C) is equal to 100 wt % of the total weight of the coating.

In some embodiments, in addition to (A), (B), and (C), the coating contains additional additives. In some embodiments, if such additional additives include inorganic additives, such inorganic additives are present in an amount equal to less than 8 wt % of the total weight of the coating (e.g., less than 8, 7, 6, 5, 4, 3, 2, 1, or 0.5 wt %).

In some embodiments, the cathode optionally comprises, in addition to a current collector, (A), (B), and (C), one or more additional constituents, provided that such one or more additional constituents sum less than 9 wt % of the total weight of the coating (e.g., less than 9, 8, 7, 6, 5, 4, 3, 2, 1, or 0.5 wt %).

In some embodiments, the cathode comprises up to 4 wt % (e.g., up to 1, 2, 3, or 4 wt %) (based on the total weight of the coating) of TiS$_2$ in addition to the TiS$_2$ in the TiS$_2$—S composite particles. In some embodiments, the only TiS$_2$ present in the cathode is the TiS$_2$ in the TiS$_2$—S composite particles.

Binders are known in the art and it is contemplated that any art-accepted binder can be used in embodiments of the inventive cathode. In some embodiments, the binder comprises a polymer binder (e.g., poly(acrylic acid), polyvinylidene fluoride, polyvinyl pyrrolidone, a combination thereof, etc.).

In some embodiments, the cathode has an initial reversible capacity of:

at least 800 mAhG (e.g., at least 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, 1400, 1410, 1420, 1430, 1440, 1450, 1460, 1470, 1480, or 1490 mAhG) at a charge rate of 0.1 C; or at least 800 mAhG (e.g., at least 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, 1250, 1260, 1270, 1280, 1290, 1300, 1310, 1320, 1330, 1340, 1350, 1360, 1370, 1380, 1390, or 1400 mAhG) at a charge rate of 0.2 C; or at least 800 mAhG (e.g., at least 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, 1130, 1140, 1150, 1160, 1170, 1180, 1190, 1200, 1210, 1220, 1230, 1240, or 1250 mAhG) at a charge rate of 0.3 C; or at least 800 mAhG (e.g., at least 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, or 1130 mAhG) at a charge rate of 0.5 C; or at least 800 mAhG (e.g., at least 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, 1110, 1120, or 1130 mAhG) at a charge rate of 1.0 C.

In some embodiments, the cathode has a capacity of at least 800 mAhG (e.g., at least 800, 810, 820, 830, 840, 850, 860, 870, 880, 890, 900, 910, 920, 930, 940, 950, 960, 970, 980, 990, 1000, 1010, 1020, 1030, 1040, 1050, 1060, 1070, 1080, 1090, 1100, or 1110 mAhG) at a charge rate of 0.3 C after 200 cycles.

In some embodiments, the cathode has a capacity retention of at least 85% (e.g., at least 85, 86, 87, 88, 89, 90, 91, 92, 93, 94, 95, 96, or 97%) after 200 cycles at a charge rate of 0.1 C, 0.2 C, 0.3 C.,0.5 C, or 1.0 C.

In some embodiments, the cathode has a capacity retention of at least 70% (e.g., at least 70, 71, 72, 73, 74, 75, 76, 77, 78, 79, 80, 81, 82, 83, 84, or 85%) after 400 cycles at a charge rate of 0.1 C, 0.2 C, 0.3 C.,0.5 C, or 1.0 C.

In some embodiments, the cathode has a capacity retention of at least 60% (e.g., at least 60, 61, 62, 63, 64, 65, 66, 67, 68, or 69%) after 600 cycles at a charge rate of 1.0 C.

In some embodiments, the cathode has a capacity retention of at least 55% (e.g., at least 55, 56, 57, 58, 59, 60, 61, 62, 63, 64, 65, or 66%) after 800 cycles at a charge rate of 1.0 C.

In some embodiments, the cathode has a capacity retention of at least 50% (e.g., at least 50, 51, 52, 53, 54, 55, 56, 57, 58, 59, or 60%) after 1000 cycles at a charge rate of 1.0 C.

In some embodiments, the cathode has a reversible capacity of at least 850 mAh g$^{-1}$ (e.g., at least 850, 860, 870, 880, 890, 900, 910, 920, 930, 940, 950, 960, 970, 980, 990, or 1000 mAh g$^{-1}$) at 0.3 C after 480 cycles.

In some embodiments, the cathode has a reversible capacity of at least 500 mAh g$^{-1}$ (e.g., at least 500, 510, 520, 530, 540, 550, 560, 570, 580, 590, 600, or 610 mAh g$^{-1}$) at 1.0 C after 1000 cycles.

In some embodiments, the cathode has a fade rate of less than 0.07% per cycle (e.g., less than 0.065, 0.06, 0.055, 0.05, 0.045, 0.04, 0.035, 0.03, 0.025, or 0.02% per cycle) over 200, 400, 600, 800, or 1000 cycles, at a charge of 0.1 C, 0.2 C, 0.3 C,0.5 C, or 1.0 C.

In some embodiments, the cathode has a fade rate of 0.01 to 0.07% per cycle (e.g., 0.01, 0.015, 0.02, 0.025, 0.03, 0.035, 0.04, 0.045, 0.05, 0.055, 0.06, 0.065, or 0.07%), including any and all ranges and subranges therein, over 200, 400, 600, 800, or 1000 cycles, at a charge of 0.1 C, 0.2 C, 0.3 C,0.5 C, or 1.0 C.

Figure 2:
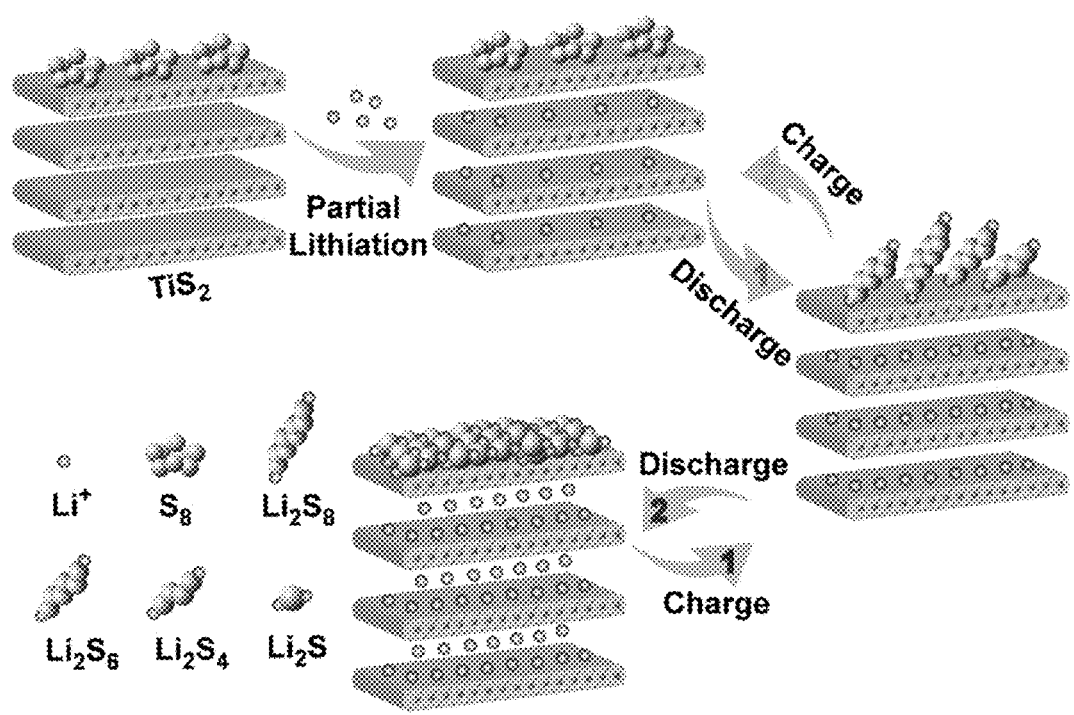
FIG. 2 is a schematic showing charge and discharge cycles for an embodiment of the inventive cathode.

FIG. 2 is a schematic showing charge and discharge cycles for an embodiment of the inventive cathode.

In a third aspect, the invention provides a lithium-sulfur (Li—S) battery comprising: an anode; a cathode according to the second aspect of the invention; and a separator, wherein the separator is positioned between the anode and the cathode.

Figure 3:
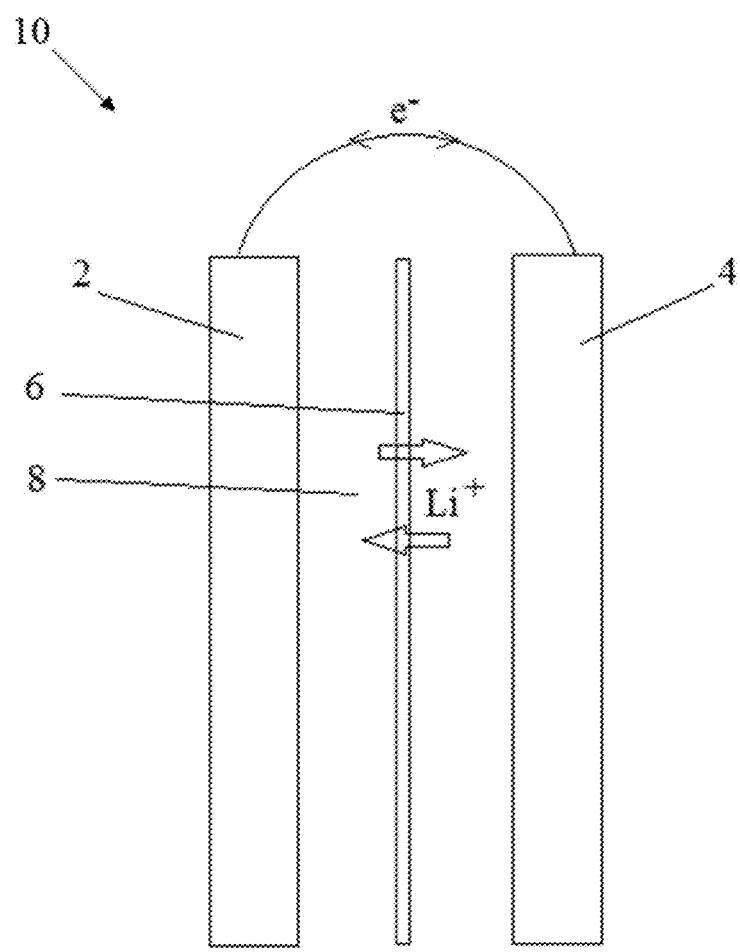
FIG. 3 is a simplified drawing of an embodiment of a Li—S battery according to the invention.

FIG. 3 is a simplified drawing of an embodiment of a Li—S battery 10 according to the invention. Li—S battery 10 includes cathode 2, anode 4, separator 6, and electrolyte 8.

Inclusion of embodiments of the inventive $TiS_2$—S composite particles in Li—S battery embodiments allows for improved electrochemical properties as compared to Li—S batteries that are similar but that do not comprise the inventive $TiS_2$—S composite particles.

Persons having ordinary skill in the art are familiar with art-acceptable anodes, separators, and electrolytes for use in Li—S batteries, and it is contemplated that any art-accepted anode, separator, or electrolyte can be used in embodiments of the inventive Li—S battery.

In some embodiments, the anode comprises an electrode material (e.g., in the form of a foil), containing at least one negative electrode active material capable of reversibly inserting lithium ions. In some embodiments, the electrode material is supported by a current collector. In some embodiments, the electrode material is selected from lithium and a lithium alloy.

In some embodiments, the electrolyte is a liquid electrolyte or a polymer electrolyte. In some embodiments, the electrolyte comprises a lithium salt that contains an Li cation (e.g., one or more of $LiPF_6$, $LiBF_4$, $LiSbF_6$, $LiAsF_6$, $LiClO_4$, $LiCF_3SO_3$, $LiC_4F_9SO_3$, $LiSbF_6$, $LiN(SO_2CF_3)_2$, $LiNO_3$, and LiBETI).

In a fourth aspect, the invention provides a process for manufacturing the cathode according to the second aspect of the invention, comprising mixing $TiS_2$—S composite particles, carbon, and binder in solvent to form a slurry, applying the slurry to a current collector, and drying the slurry to form the coating.

In some embodiments, the $TiS_2$—S composite particles are formed by melt infusing sulfur onto $TiS_2$ substrate particles.

In some embodiments, the solvent comprises N-methyl-2-pyrrolidone.

EXAMPLES

The invention will now be illustrated, but not limited, by reference to the specific embodiments described in the following examples.

Materials

Titanium powder (99.99%, 300 mesh) was purchased from Aladdin Reagents Co., Ltd. Sulfur (99.5%) was purchased from Sinopharm Chemical Reagent Co. Ltd. Bis (trifluoromethane) sulfonimide lithium salt (LiTFSI, 99.95%), Poly(acrylic acid) (average My ~450,000), N-methyl-2-pyrrolidinone (NMP, 99%), polyvinylidene fluoride (PVDF, average Mw ~534,000), 1,3-dioxolane (DOL, 99.8%) and 1,2-dimethoxyethane (DME, 99.5%) were purchased from Sigma-Aldrich. All materials were used without further purification.

Synthesis of $TiS_2$ Substrates

Figure 4A:
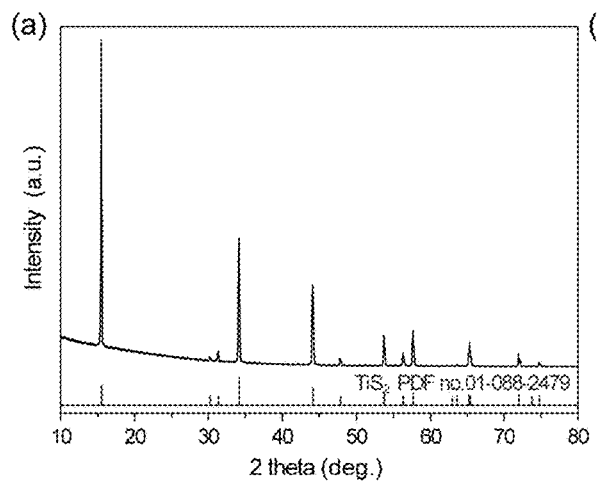
FIGS. 4A and 4B are PXRD patterns (4A) and nitrogen adsorption-desorption isotherms (4B) for the embodiment of $TiS_2$ shown in FIGS. 1A and 1B.
Figure 4B:
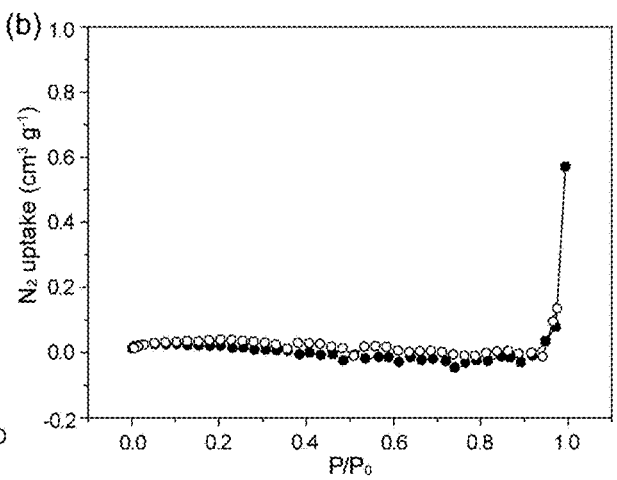

Bulk $TiS_2$ powders were synthesized by the solid-state reaction of Ti powder and S (4 at. % excess). The powdered mixture was ground in a mortar for 30 min, and then put into a quartz tube in an Ar filled glove-box ($H_2O$<1 ppm, $O_2$<1 ppm). After moving the tube out of the glove-box, it was evacuated to 0.1 torr and then sealed. The samples were heated slowly to 850° C. for 7 days, and then cooled to room temperature. A layered and hexagonal structure (space group, P-3 ml) was verified by scanning electron microscopy (SEM) and XRD (FIGS. 1A and 1B, and FIG. 4A). A nitrogen adsorption-desorption isotherm measurement of TiS$_2$ was carried out and the results showed almost no nitrogen adsorption (FIG. 4B), indicating that the TiS$_2$ is essentially non-porous.

Synthesis of TiS$_2$—S and BP2000-S

Figure 5A:
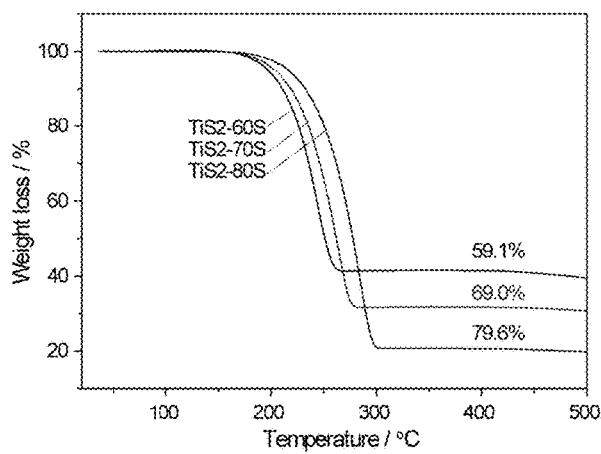
FIG. 5A depicts TGA curves under a N2 atmosphere of $TiS_2$ with different sulfur loadings.
Figure 5B:
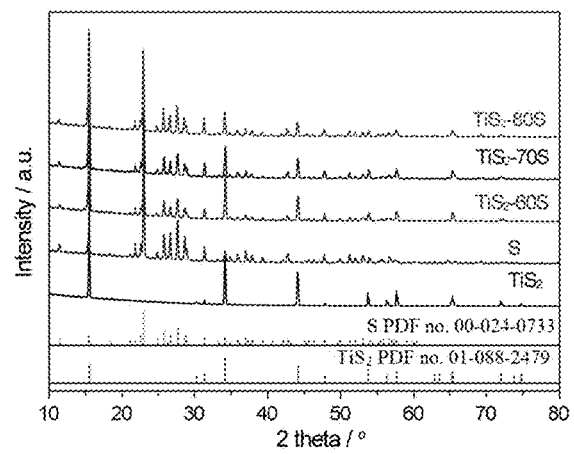
FIG. 5B depicts XRD patterns of $TiS_2$, S, and $TiS_2$ with different sulfur loadings.

Sulfur was incorporated into the TiS$_2$ host by mechanical mixing and melt infusion to generate a TiS$_2$—S composite in a quantitative manner. TiS$_2$ and BP2000 were degassed at 120° C. for 12 h, then transferred into a glove-box, and mixed with sulfur. The mixture was grounded for 30 min to obtain a uniform mixture, and then sealed in a pyrex tube and heated at 155° C. for 20 h at a heating rate of 0.5° C. mini. The exact sulfur loadings of 59.1, 69.0, and 79.6% were determined by thermo-gravimetric analysis (FIG. 5A). XRD measurements of the TiS$_2$—S composites indicated the presence of a mixture of the TiS$_2$ phase and crystalline sulfur (FIG. 5B). The absence of any peak shifts of the TiS$_2$ suggests that the sulfur is located outside the TiS$_2$ layers.

Characterization

Figure 6:
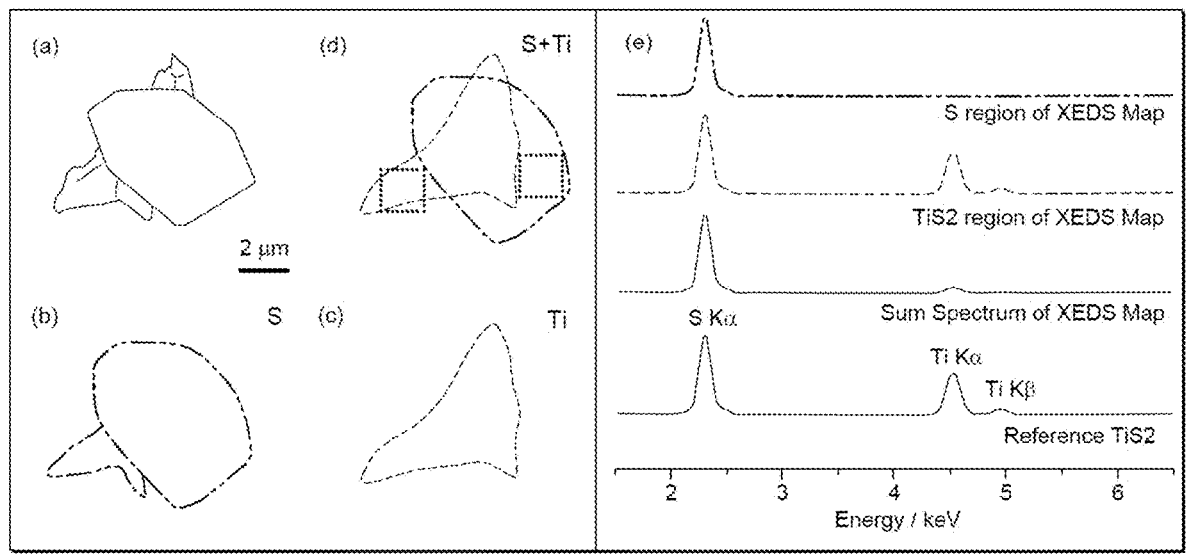
FIG. 6 shows: (a) a line drawing of a cryo-HAADF-STEM image of an embodiment of a $TiS_2$-60S (60 wt % sulfur) composite; (b, c, d) XEDS elemental mapping of S, Ti and overlay of S vs. Ti; (e) XEDS spectra of $TiS_2$ reference, sum spectrum of the whole)(EDS map, $TiS_2$ region (from left dashed box in (d)) and S region (from right dashed box in (d)).
Figure 7:
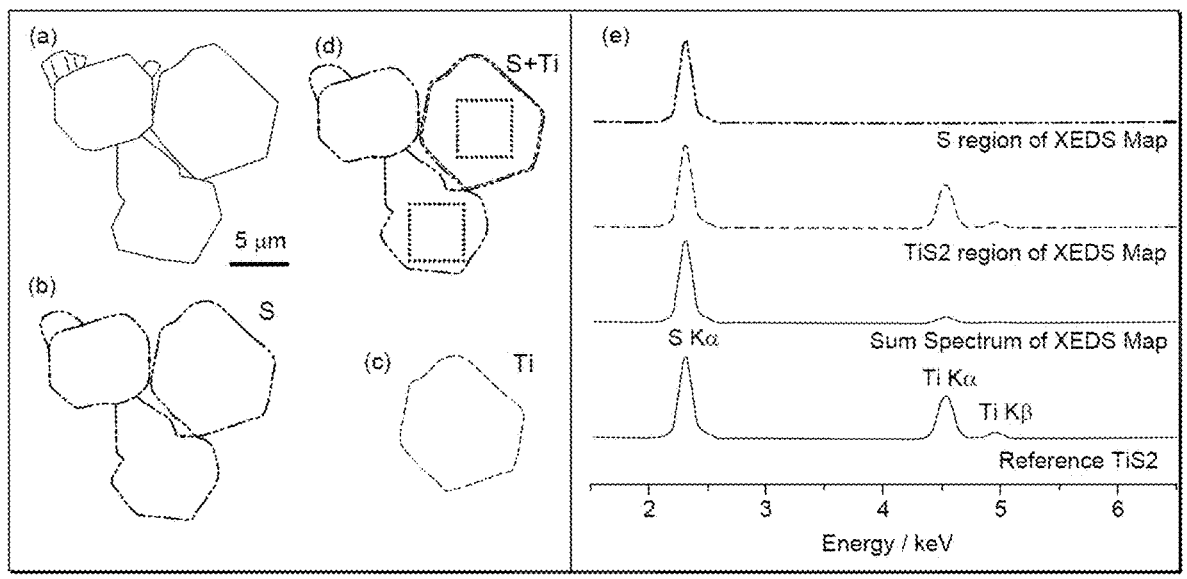
FIG. 7 shows: (a) a line drawing of a cryo-HAADF-STEM image of an embodiment of a $TiS_2$-60S composite; (b,c,d))(EDS elemental mapping of S, Ti and overlay of S vs. Ti; (e) XEDS spectra of reference $TiS_2$, sum spectrum from the whole XEDS map, $TiS_2$ region (from upper dashed box in (d)) and S region (from lower dashed box in (d)).

To directly observe the distribution of sulfur in the composite, cryo-STEM was employed for imaging, and X-ray energy dispersive spectroscopy (XEDS) for elemental mapping and quantitative elemental analysis (FIG. 6 and FIG. 7). Compared to traditional TEM, by keeping the samples near liquid N$_2$ temperature (−183° C.), cryo-TEM has been shown to effectively suppress sulfur sublimation, enabling the reliable characterization of the distribution of sulfur in sulfur-host composites.

The cryo-STEM image in FIG. 6(a) shows a composite of two connected, overlapping particles. According to the S, Ti and overlay maps in FIG. 6(b-d), the upper particle is elemental sulfur and the bottom particle is TiS$_2$. It is important to know if any elemental sulfur may have infiltrated into the TiS$_2$ layers or if it covered the surface of the TiS$_2$. This could be established by comparing spectra from different regions of the)(EDS map (FIGS. 6(e) and 7(e)). In the TiS$_2$ region of the)(EDS map (FIG. 6(d) left dashed box), an STi peak intensity ratio of about 1.77 was calculated, which is nearly identical to the value for the pure TiS$_2$ sample (1.79). This indicates that no elemental sulfur has infiltrated into the layers of TiS$_2$. This observation was further confirmed by analysis of other composite particles (FIG. 7), and is also consistent with the lack of XRD peak shifts in the TiS$_2$ profile (FIG. 5B).

Electrochemical Measurements

Figure 19:
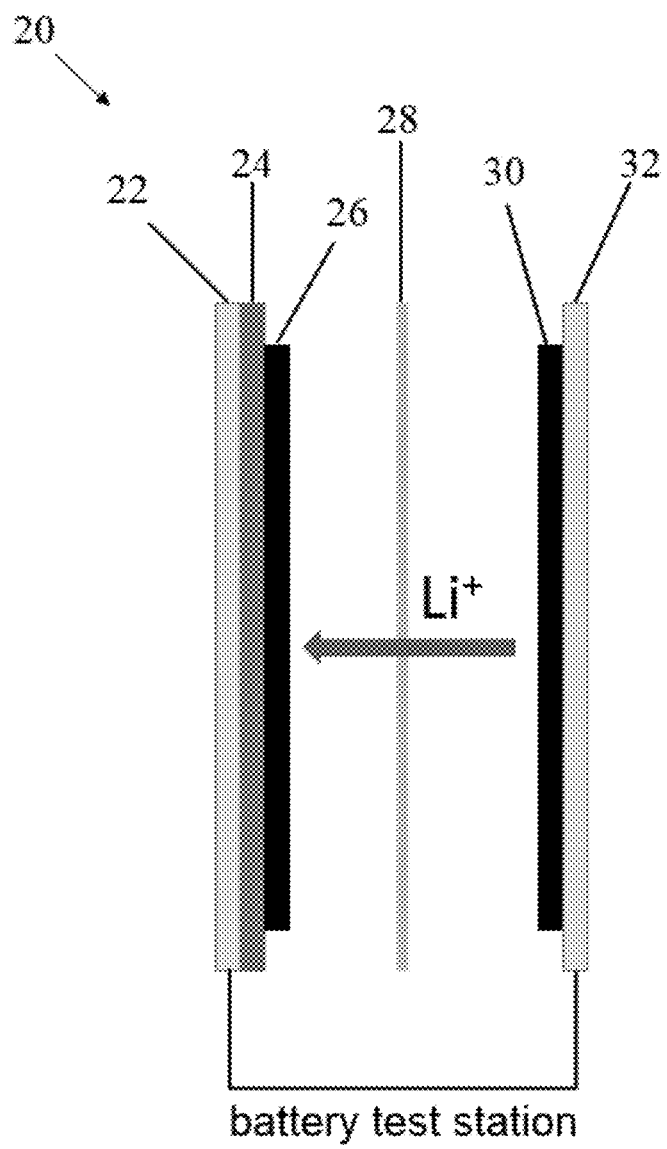
FIG. 19 is a simplified schematic of an embodiment of a coin-cell setup.

Electrochemical experiments were carried out in CR2016-type coin cells. FIG. 19 is a simplified schematic of a coin-cell setup 20, which includes coin cell left cap 22, aluminum foil current collector 24, TiS$_2$—S composite cathode 26, separator 28, lithium foil anode 30, and coin cell right cap 32. The various TiS$_2$—S (BP2000-S) composites were mixed with BP2000 carbon black and poly(acrylic acid) binder in N-methyl-2-pyrrolidinone (NMP) with mass ratios of 70:20:10 to form a slurry. The slurry was coated onto aluminum foil current collectors and dried at 60° C. for 12 hours under vacuum. The sulfur mass loading of the composite electrodes ranged from 0.8 to 1.2 mg cm$^{-2}$. The microporous interlayers were fabricated by mixing BP2000 and PVDF binder in N-methyl-2-pyrrolidinone (NMP) with mass ratios of 60:40 to form a slurry, and coated onto waterleaf carbon paper, and dried at 80° C. for 12 hours under vacuum. The areal loading of the BP2000 is about 1.0 mg cm$^{-2}$. CR 2016-type coin cells were assembled in an argon-filled glove-box using Li foil as the counter electrode, microporous carbon interlayers and Celgard 2400 as separator. The electrolyte was 1.0 M lithium bis(trifluoromethanesulfonyl) imide (LiTF SI) in a mixture of 1,3-dioxolane (DOL) and 1,2-dimethoxyethane (DME) 1:1 (vol %). The electrolyte-to-sulfur ratio is 30 μL per milligram sulfur. The cells were galvanostatically discharged and charged on a battery test system (SLAN BT100, Wuhan) between 1.5 and 3.0 V at room temperature. Cyclic voltammetry (CV) was carried out on a VMP3 potentiostat/galvanostat station (Bio-logic Science Instruments).

Figure 8A:
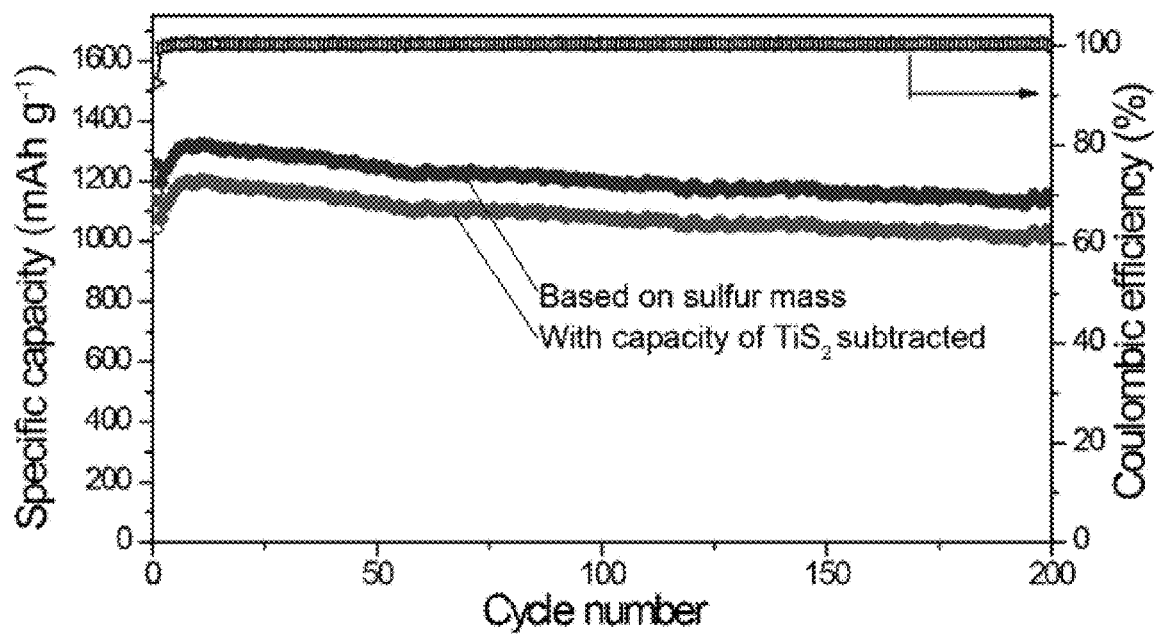
FIGS. 8A-E are plots of specific capacity versus cycle number for (8A) $TiS_2$-60S and (8B) BP2000-605 electrodes at 0.3 C.
Figure 8B:
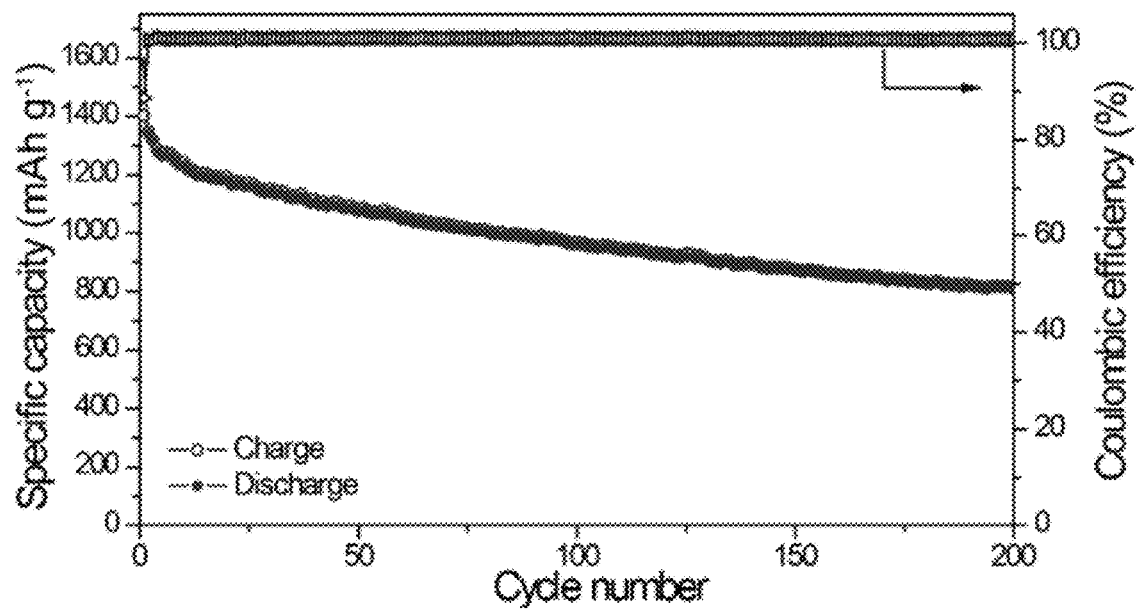
Figure 9A:
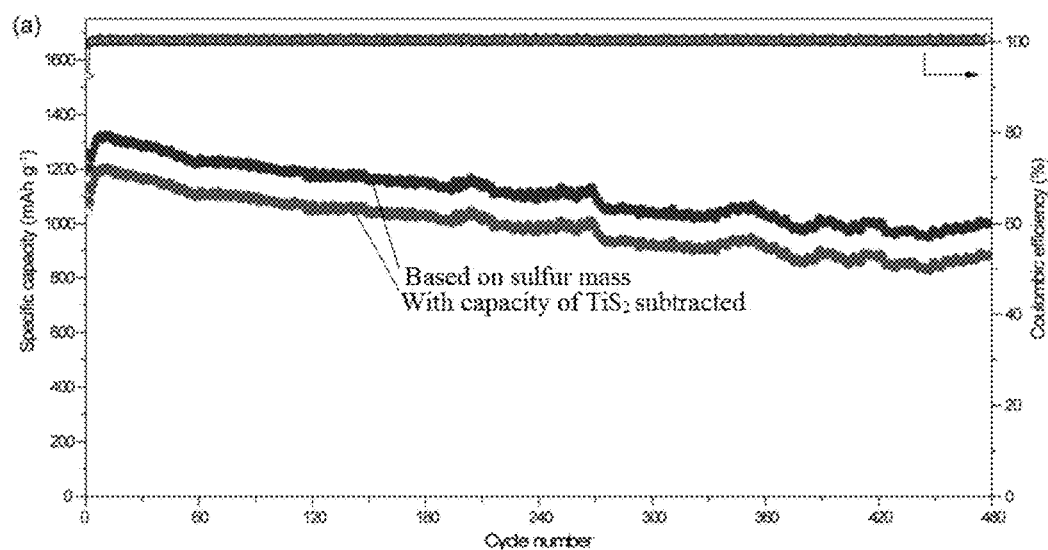
FIGS. 9A-C are.
Figure 9B:
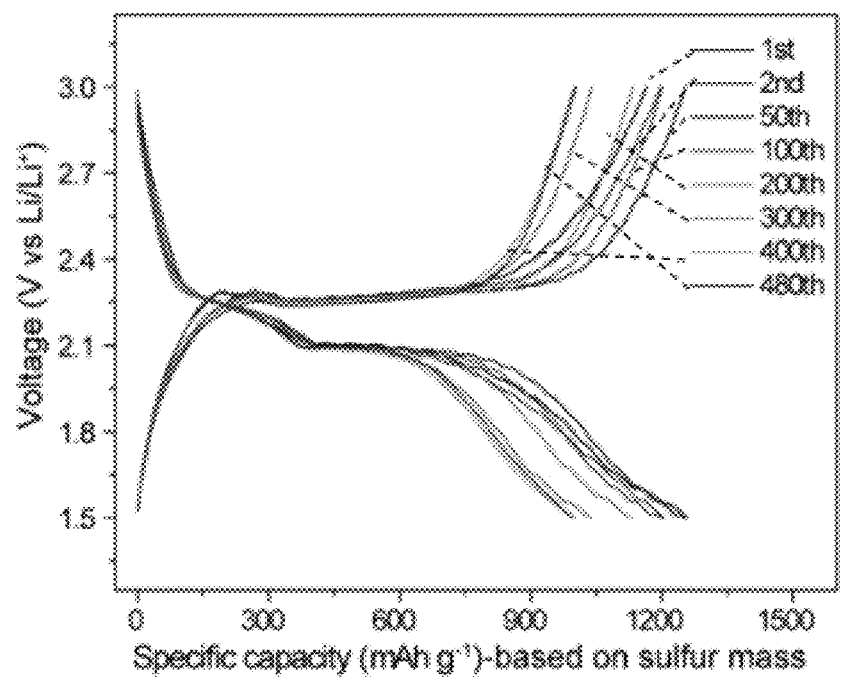
Figure 9C:
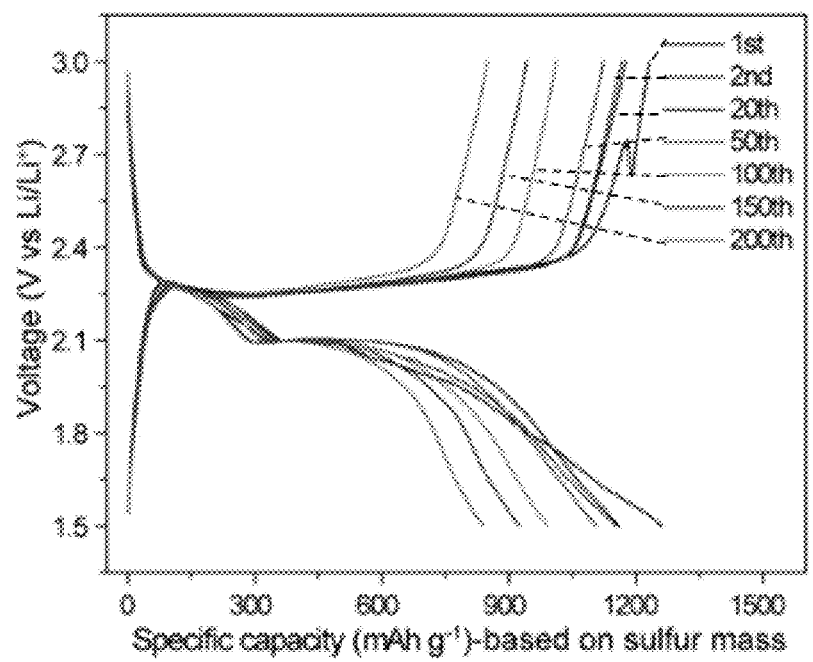
Figure 10A:
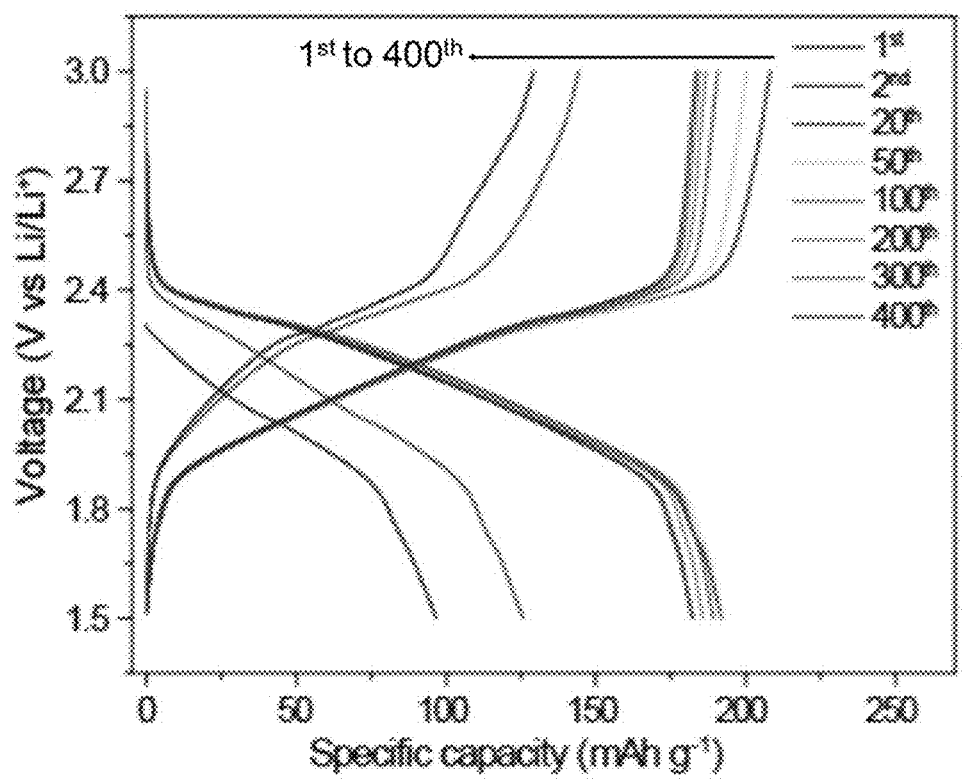
FIGS. 10A-F are voltage profiles and cyclic capacity performance of $TiS_2$ electrodes at current densities of (10A, 10B) 50 mA $g^{-1}$, (10C, 10D) 50 to 6000 mA $g^{-1}$, and (10E, 10F) BP2000 electrode in 1 M LiTFSI DMEDOL (1:1, vol.) electrolyte.
Figure 10B:
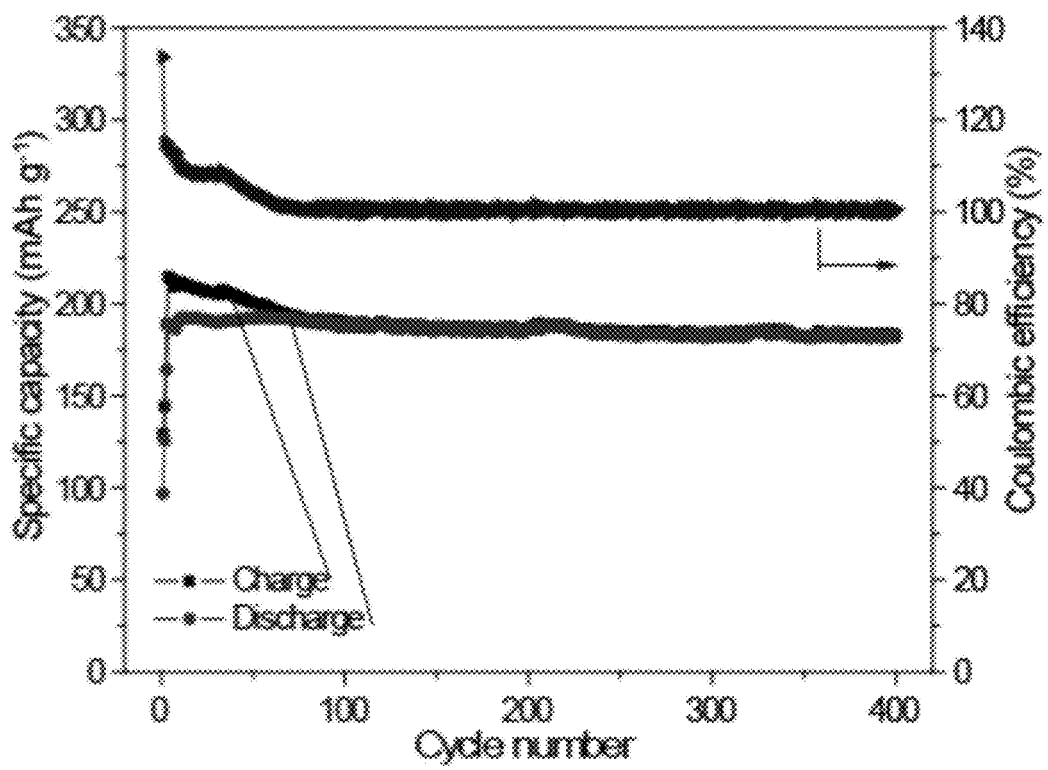
Figure 10C:
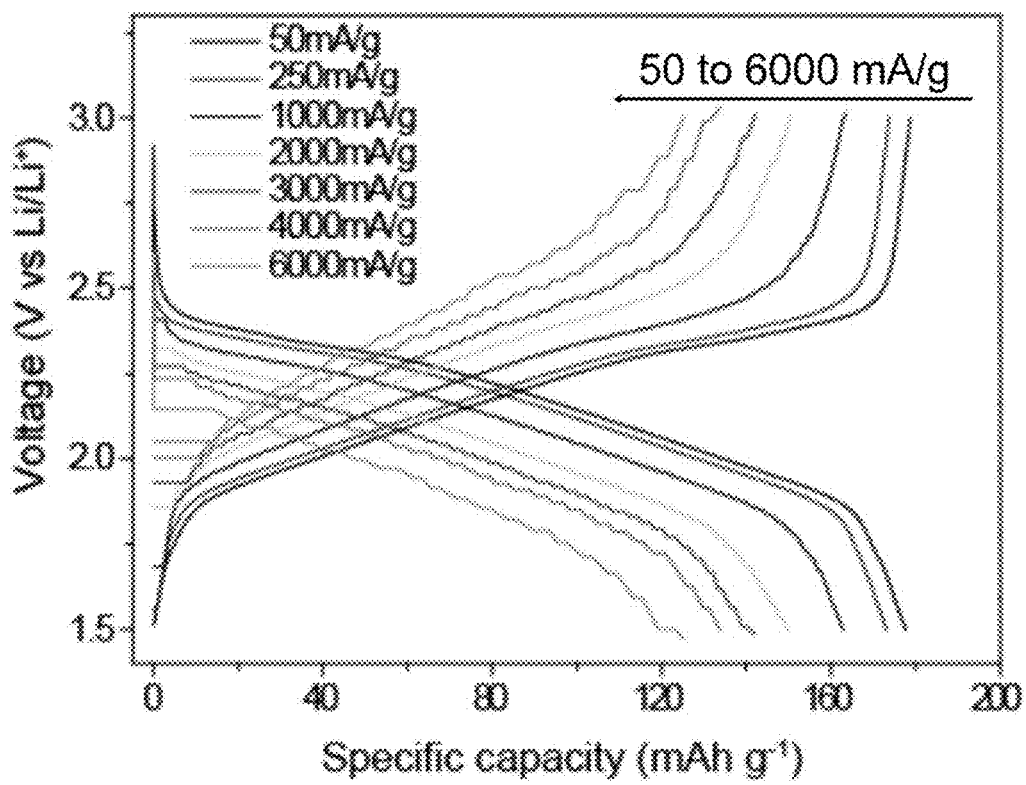
Figure 10D:
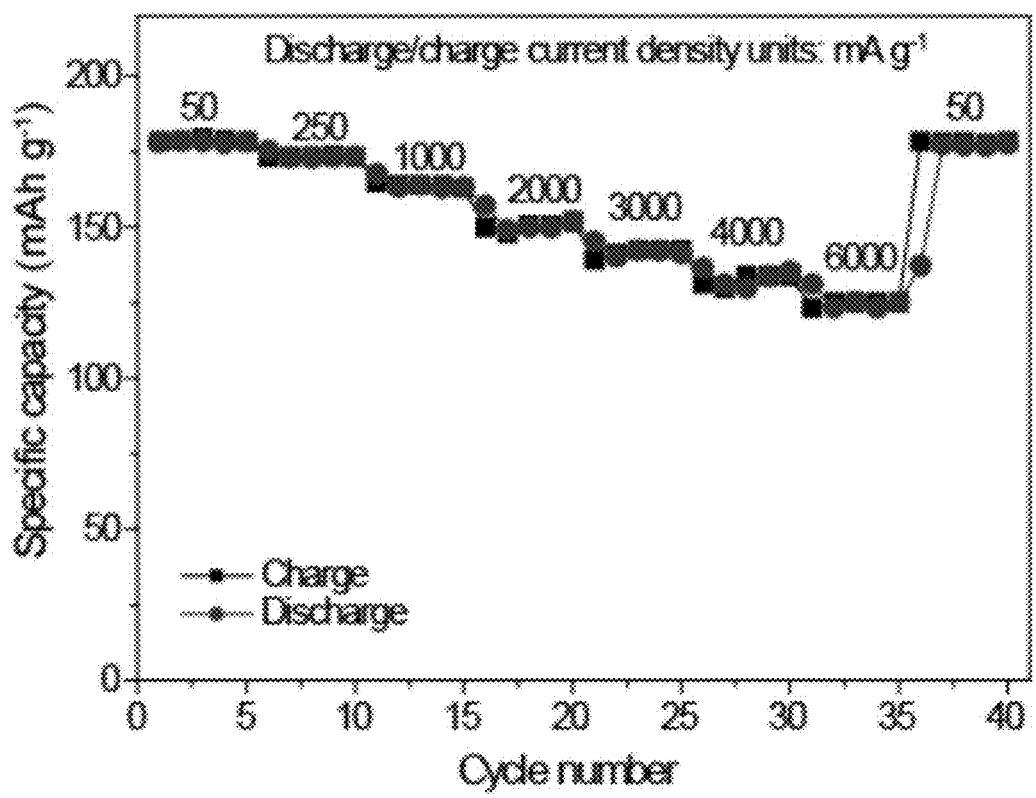
Figure 10E:
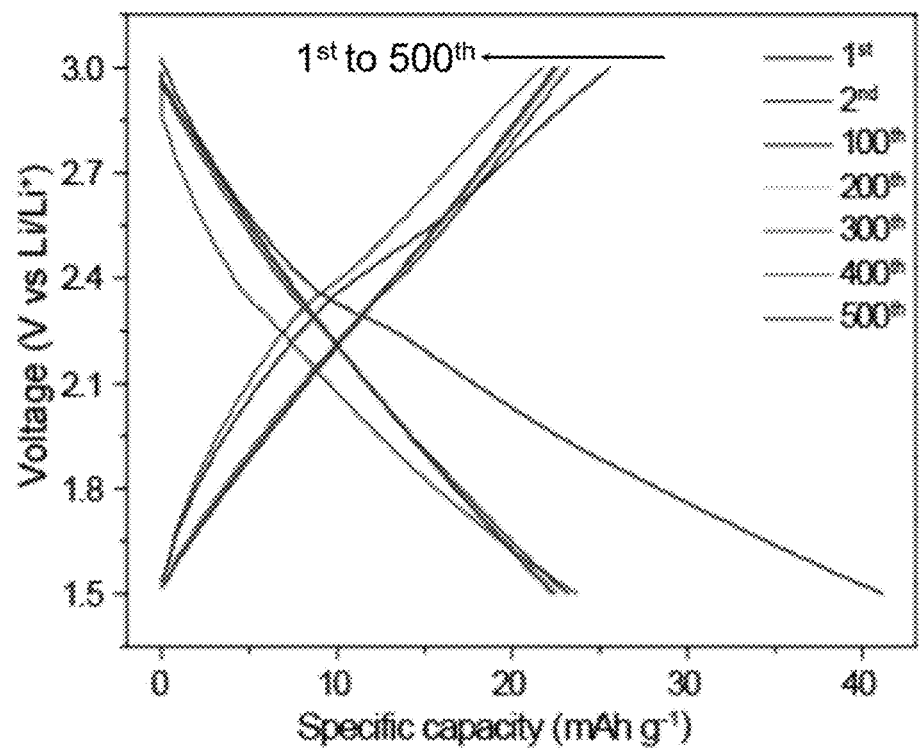
Figure 10F:
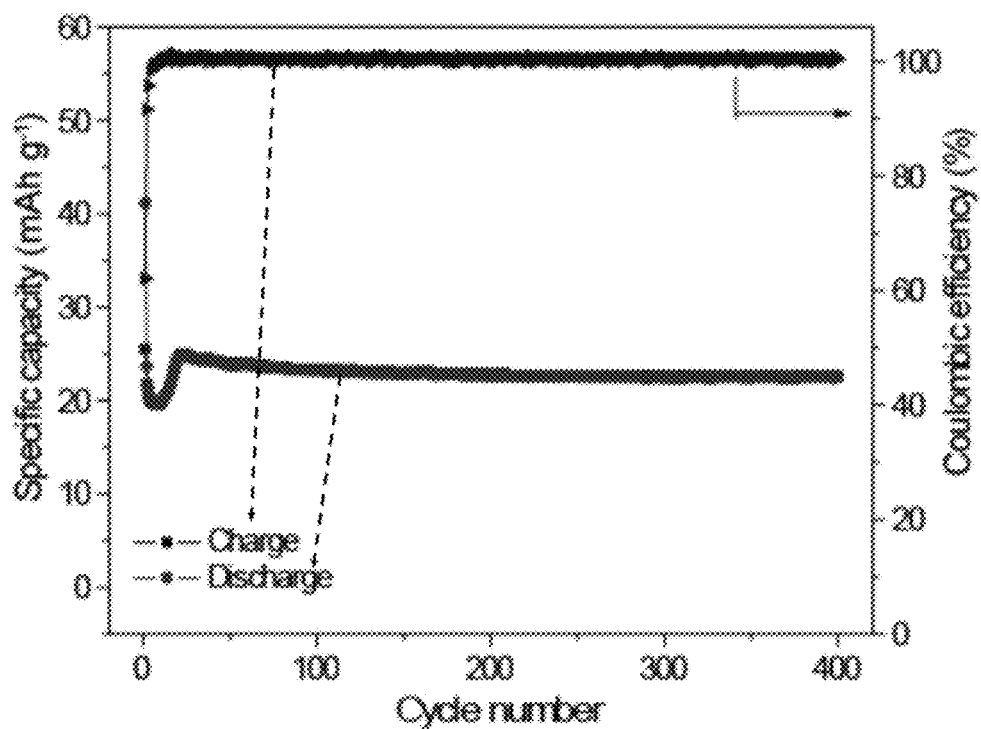
Figure 11A:
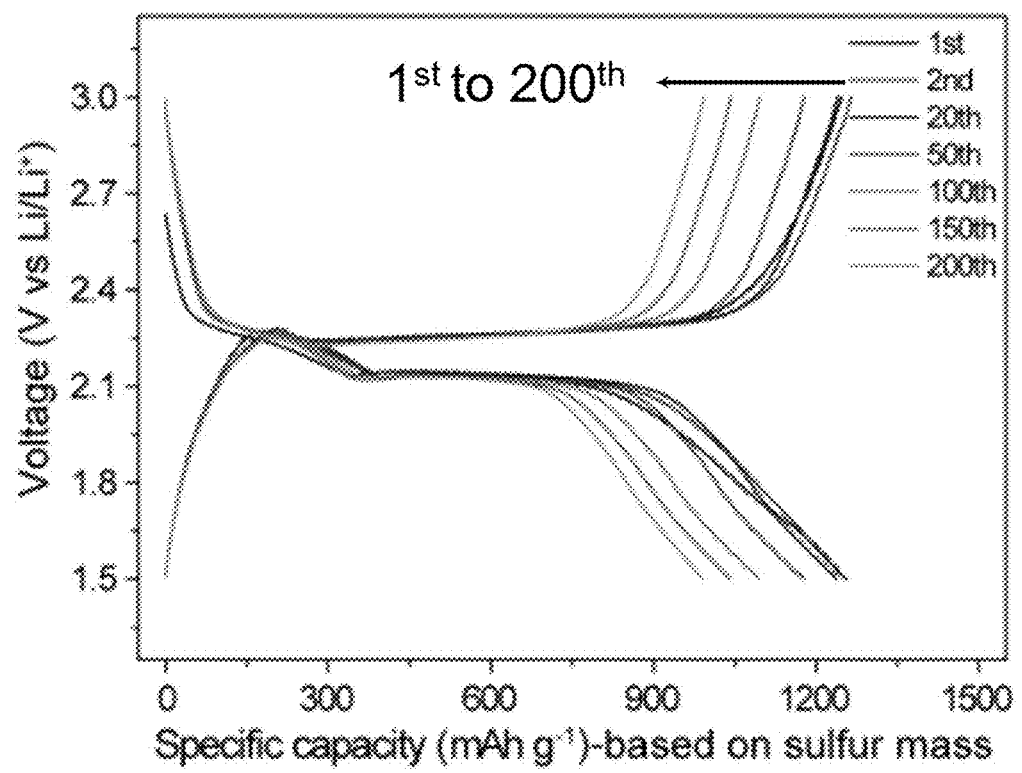
FIGS. 11A-D are voltage profiles and plots of specific capacity versus cycle number of (A, B) $TiS_2$-70S and (C, D) $TiS_2$-80S electrodes at a rate of 0.1 C.
Figure 11B:
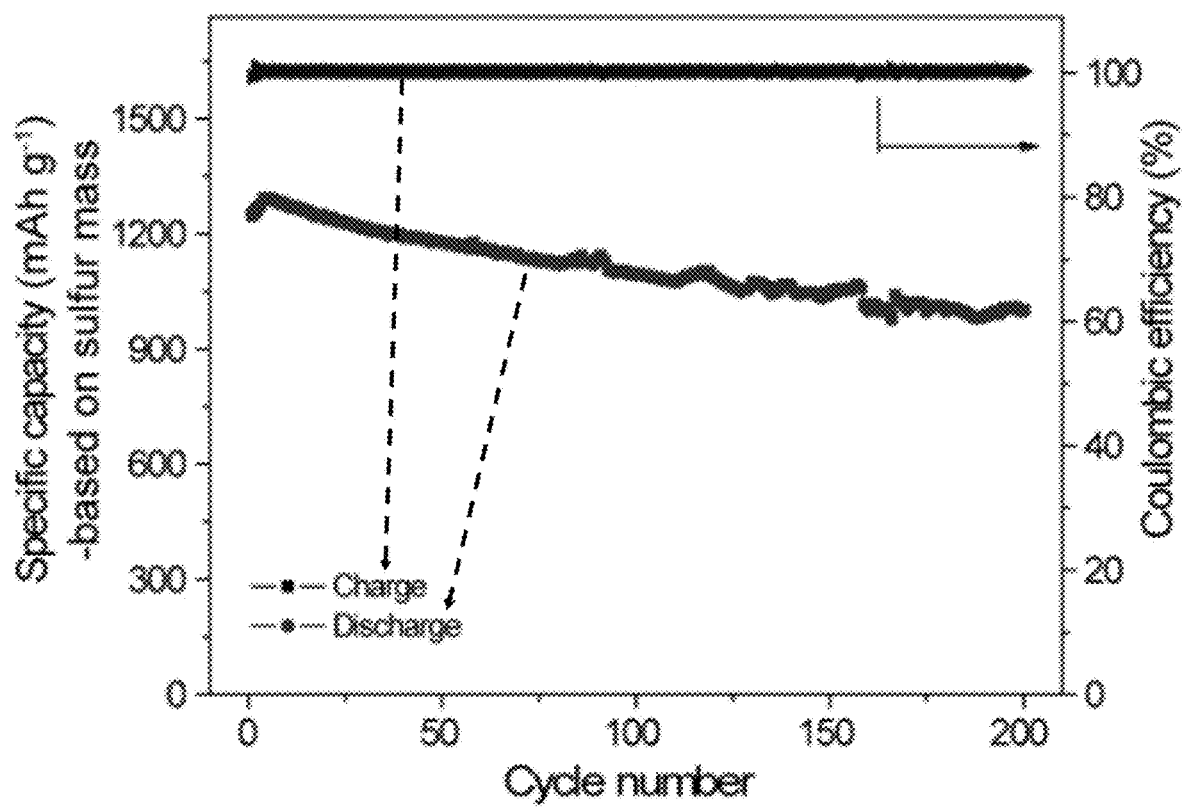
Figure 11C:
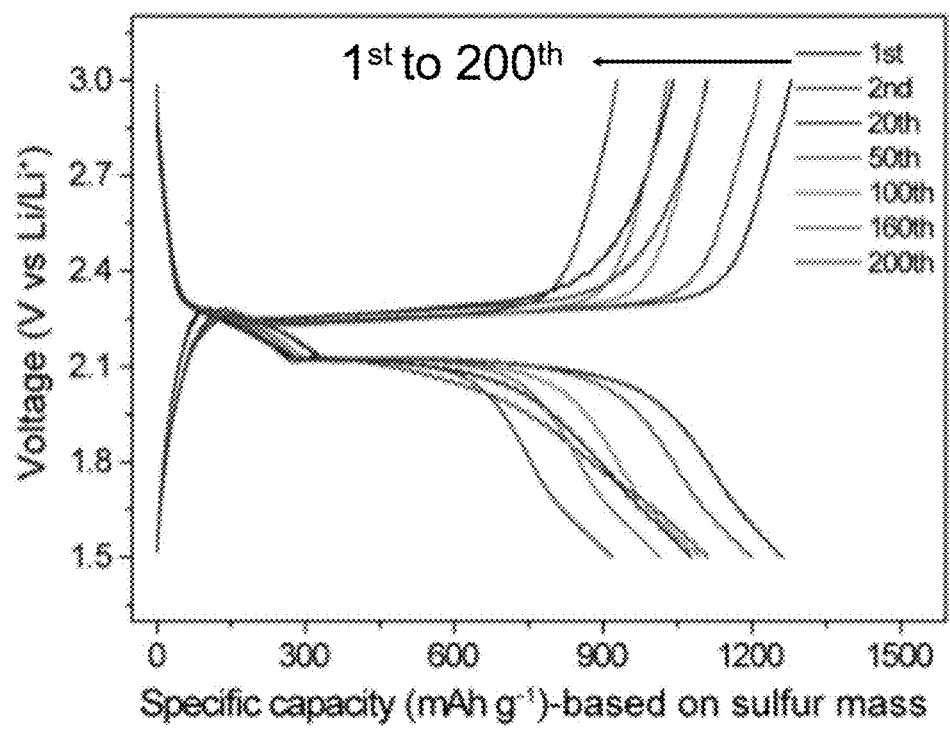
Figure 11D:
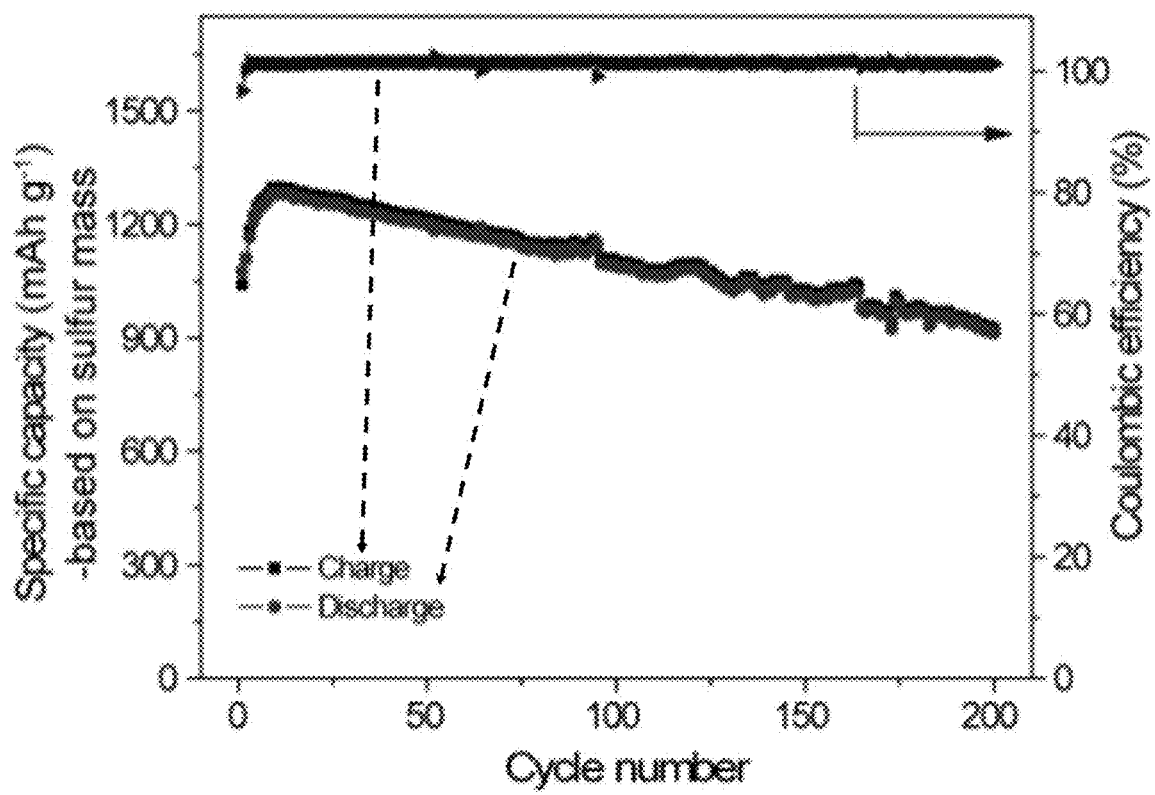

FIGS. 8A and 9A present the cycling performance of a TiS$_2$-60S electrode at 0.3 C. The initial discharge and charge capacities were 1257 and 1163 mAh g$^{-1}$, respectively, based on the sulfur mass. After 200 cycles, the capacity was 1138 mAh g$^{-1}$, and 1000 mAh g$^{-1}$ after 480 cycles (FIG. 9A). The cell exhibited an excellent capacity retention of 97.0% and 85.6% after 200 and 480 cycles, respectively. Since it is known that TiS$_2$ is active for lithiation, the electrochemical performance of the TiS$_2$ electrode was further measured under the same conditions (FIGS. 10A-F). The TiS$_2$ electrode exhibited highly reversible Li insertion/deinsertion processes, even at the high current density of 6000 mA g$^{-1}$. The capacity of the TiS$_2$ electrode was 180 mAh g$^{-1}$ after 400 cycles. After subtracting the contribution from TiS$_2$, the capacities of the TiS$_2$-60S electrodes were 1018 and 880 mAh g$^{-1}$ up to 200 and 480 cycles (FIGS. 8A and 9A), respectively. Furthermore, the high cycling performance was maintained when the sulfur loading increased to 80 wt. % (FIG. 11). A control electrode, consisting of high surface area (1200m$^2$ g$^{-1}$) microporous carbon (Black Pearls 2000, CABOT), with an average pore size of 0.93 nm and with a 60 wt. % sulfur loading (BP2000-60S) was prepared. While the BP2000-60S electrode exhibited an initial discharge capacity of 1260 mAh g$^{-1}$, it dropped to 839 mAh g$^{-1}$ after 200 cycles at 0.3 C (FIG. 8B), corresponding to a capacity retention of 66.6%, much lower than that of the TiS$_2$-60S composite (97.0%).

Figure 8C:
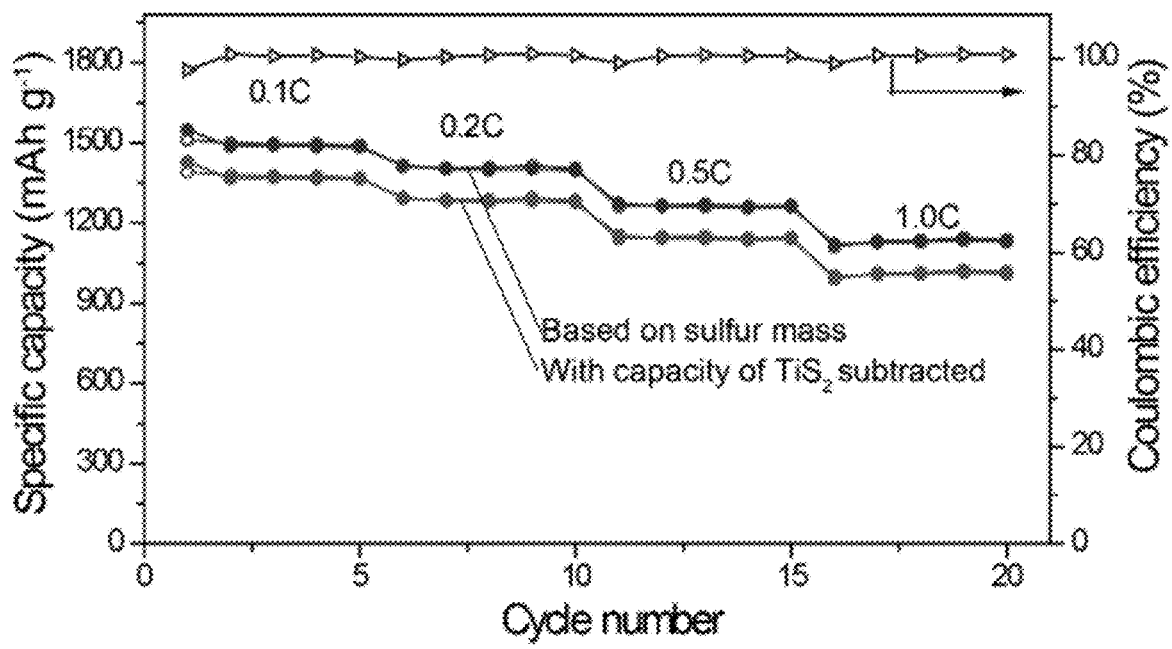
Figure 8D:
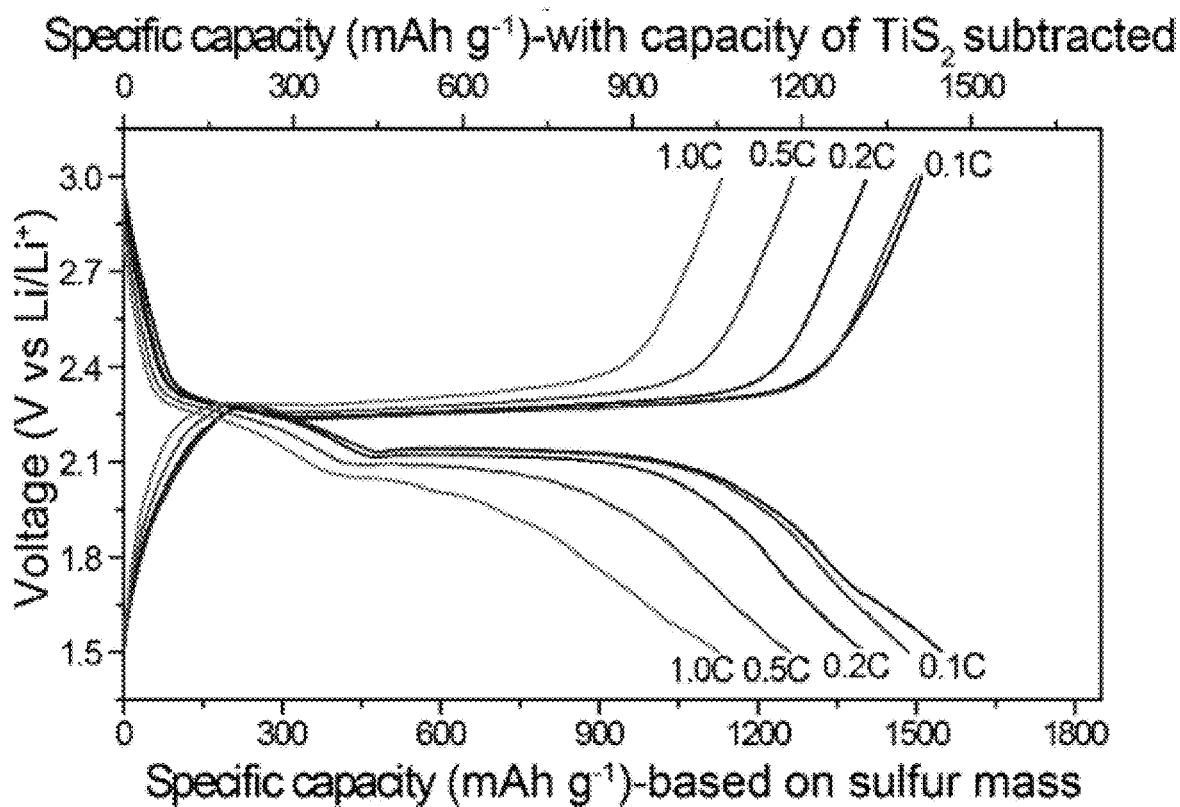
Figure 8E:
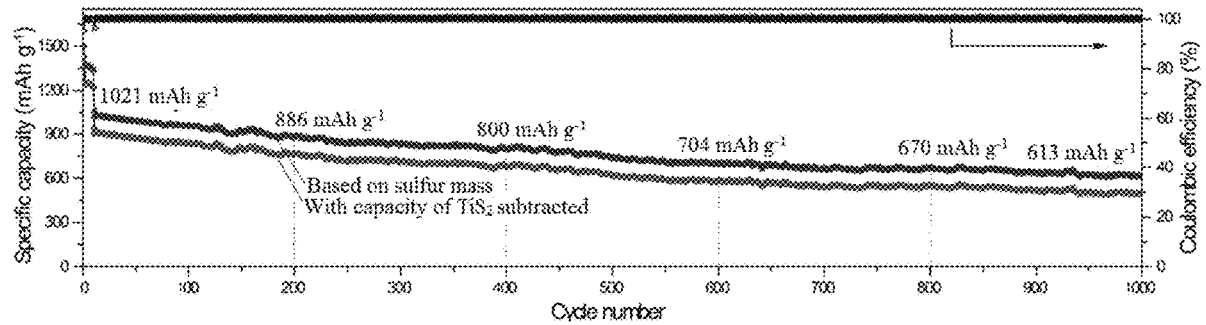

The rate capability of the TiS$_2$-60S composite electrode was further tested (FIGS. 8C and 8D). TiS$_2$-60S delivered reversible capacities of 1498, 1409, 1266 and 1132 mAh g$^{-1}$ at rates of 0.1, 0.2, 0.5 and 1.0 C, respectively. In addition, two relatively flat potential plateaus were maintained even at a rate of 1.0 C during the discharge process (FIG. 8D). In order to evaluate the stability of TiS$_2$-60S electrode at a high C-rate, the electrochemical performance was measured at 1.0 C (FIG. 8E). The initial reversible capacity was 1021 mAh g$^{-1}$, and the capacity retention values were 87, 78, 69, 66 and 60% after 200, 400, 600, 800 and 1000 cycles, respectively, with a fade rate of 0.04% per cycle. Both the capacity and cyclability of the TiS$_2$—S electrodes were much better than those of metal-sulfides-based S electrodes in previous studies. These results demonstrate that the TiS$_2$-60S electrode exhibits excellent capacity retention and a long cycling life at relatively high C-rates.

To further explore the lithiation/delithiation process of TiS$_2$, the differential capacity curves and cyclic voltammetry (CV) of the TiS$_2$ electrode were measured (FIG. 12 and FIGS. 13A-B). Compared to TiS$_2$, the absence of any peaks in BP2000 suggests that BP2000 cannot store Li between 1.5 and 3.0 V. As for TiS$_2$, the onset potential of 2.59 V and the upper redox potential of 2.44 V, determined from CV (FIGS. 13A-B), lie above the polysulfide window of 2.1 V≤$^o$>2.4 V, suggesting that it can oxidize LiPSs. Meanwhile, the peak potential of 2.36 V during the discharge processes is higher than the first plateau (2.26 V) of a sulfur electrode. The peak shape and potential for the delithiation process are almost the same as those in the lithiation process, suggestive of rapid kinetics.

In situ XRD studies of TiS$_2$ and TiS$_2$—S electrodes were carried out to investigate/determine structural changes during cycling.

The TiS$_2$ slurry was coated onto stainless steel nets, while the TiS$_2$—S composite slurry was coated onto mircroporous interlayers. An in situ XRD cell was assembled in a glovebox and beryllium (Be) was used as an X-ray transmissive window. In situ XRD was performed on a Smartlab (Rigaku) with filtered Cu Kα radiation (Rigaku Dmax-2500, λ=1.5405 Å) and a high power of 9 kW. In situ XRD was done by sequential scans, with each scan collected between 10° and 50° at a scanning rate of 20° min$^{-1}$.

As shown in FIGS. 14 and 16, lithiation/delithiation of the TiS$_2$ electrode occurred between 1.5 and 3.0 V at 50 mA g$^{-1}$. During the first discharging process, a shoulder peak appeared at 15.13° when discharged to 2.36 V. This shoulder peak shifted to lower angles and its intensity increased with intercalation of Li$^+$ into TiS$_2$ to form Li$_x$TiS$_2$ (0<x≤1). Simultaneously, the intensity of the TiS$_2$ (001) reflection at 15.53° decreased. At the end of the initial lithiation, a strong peak, located at 14.31°, was observed and identified as the (001) reflection of LiTiS$_2$ (PDF #01-083-2459), indicating an expansion of the interlayer spacing from 0.569 nm to 0.618 nm. As a result, the variation of Li$_x$Ti S2 (0<x≤1) suggests that the TiS$_2$ is a dynamic host. During the charging process, the (001) reflection for the LiTiS$_2$ phase initially decreased, then shifted to a higher angle. The final location of the peak was at 15.46° with a weak shoulder at 15.1° The cyclic voltammetric profiles of the TiS$_2$ electrode (FIGS. 13A-B) clearly exhibit an increase in $\Delta E_p$ with increasing scan rate suggesting a kinetic limitation. This could arise, at least in part, to partial retention of lithium ions in the bulk of TiS$_2$, as reflected by the peak at 2θ=15.1°, which was attributed to a Li$_x$TiS$_2$ (0<x<1) phase.

During subsequent cycles, similar phenomena were consistently observed. Based on this in situ XRD analysis, without being bound to theory, we propose the following reaction mechanism:

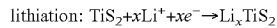

lithiation: TiS$_2$+xLi$^+$+xe$^-$→Li$_x$TiS$_2$

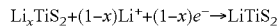

Li$_x$TiS$_2$+(1−x)Li$^+$+(1−x)e$^-$→LiTiS$_2$

delithiation: LiTiS$_2$→Li$_x$TiS$_2$+(1−x)Li$^+$+(1−x)e$^-$

Figure 14A:
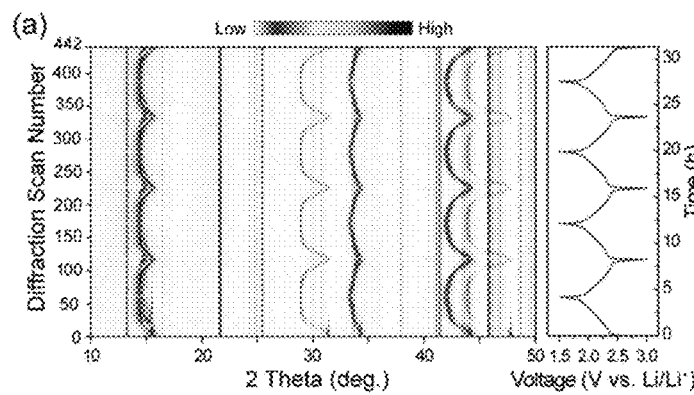
FIGS. 14A-D depict: (14A) First four-cycle discharge-charge curves and the corresponding in situ XRD patterns of a $TiS_2$ electrode at 500 mA $g^{-1}$. (14B) Discrete XRD selected from (14A). (14C) First three-cycle discharge-charge curves and the corresponding in situ XRD patterns of a $TiS_2$-60S electrode at 0.1 C, the weak intensity in the dashed regions were assigned to $Li_2S$ and can be seen more clearly in FIG. 15. (14D) Discrete XRD selected from (14C).
Figure 14B:
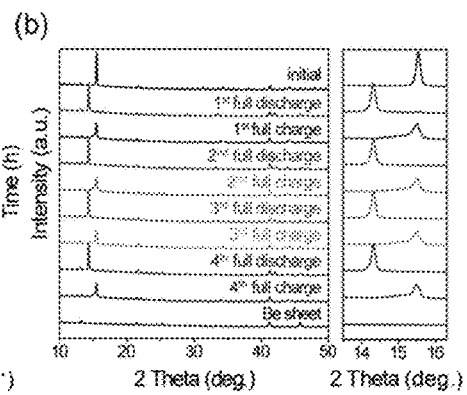
Figure 14C:
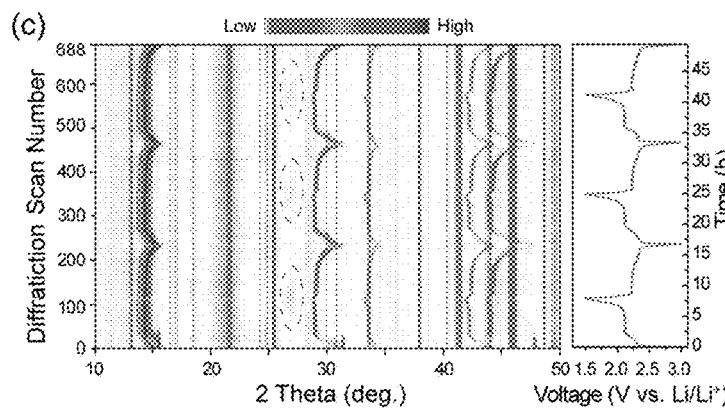
Figure 14D:
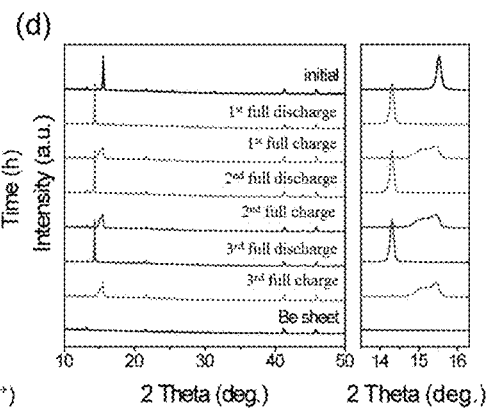
Figures 15A, 15B:
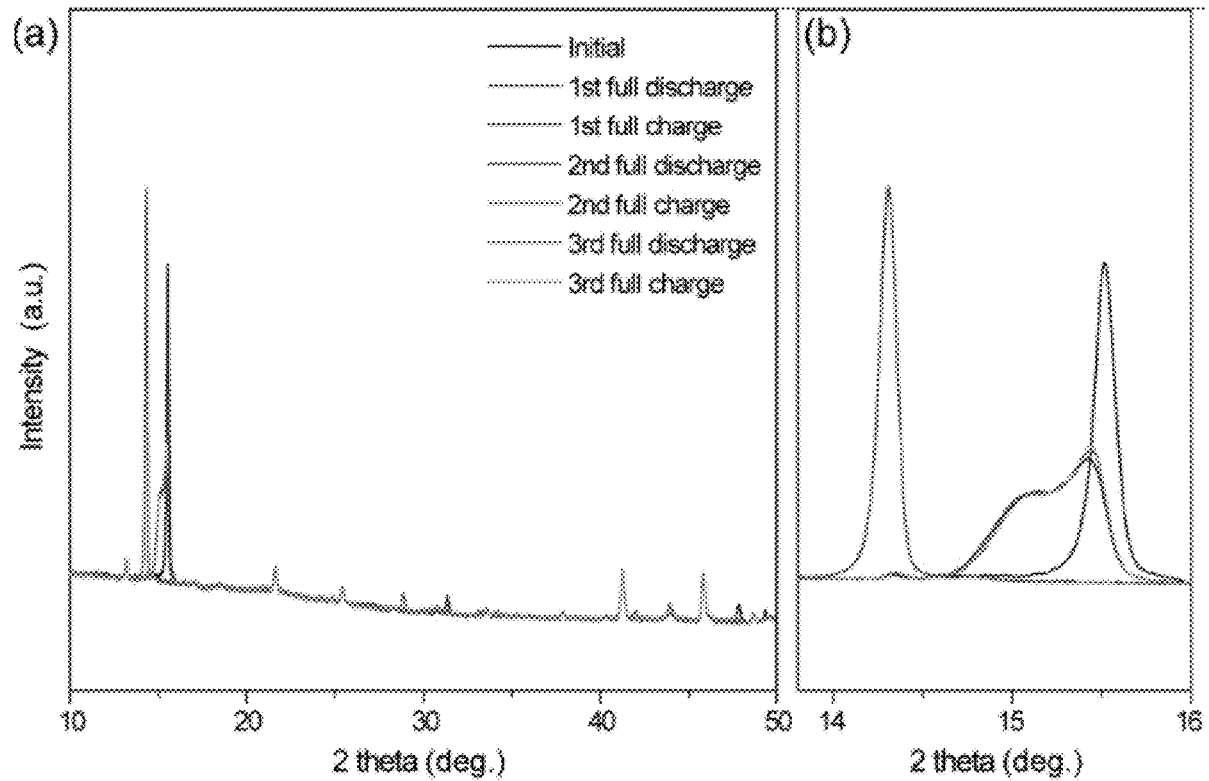
FIGS. 15A-C are selected in situ XRD patterns of $TiS_2$-60S electrode during cycling at (15A) 2θ=10.0-50.0°, (15B) 2θ=13.8-16.0°, and (15C) 2θ=25.8-28.5°.
Figure 15C:
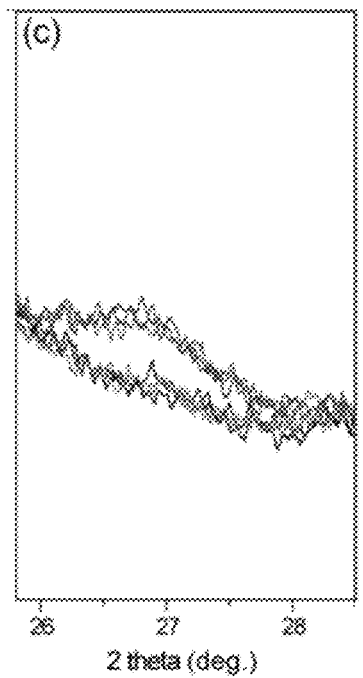

In situ XRD of a TiS$_2$—S electrode was also used to study the initial three cycles at 0.1 C (FIGS. 14C and 14D). As before, TiS$_2$ was also completely converted to LiTiS$_2$ during the initial discharge process. The discharge products of the TiS$_2$-60S cathode were crystalline LiTiS$_2$ and amorphous Li$_2$S during all cycles (FIGS. 14C and 14D). The formed Li$_2$S was identified by the weak intensity in the dashed regions in FIG. 14C, which can be seen more clearly in FIG. 15B. Upon charging, LiTiS$_2$ disappeared and was converted to Li$_x$TiS$_2$ (0<x<1). Meanwhile, a shoulder peak for the TiS$_2$—S cathode grew at 15.1° (FIG. 15), which was much stronger than the shoulder peak of the TiS$_2$ electrode (FIG. 16). According to a previous study, polysulfides were proposed to adsorb on the edge sites of transition metal dichalcogenides. Therefore, this difference is ascribed to the influence of polysulfides and/or Li$_2$S on the delithiation processes of LiTiS$_2$ in the TiS$_2$—S cathode. The diffraction peak of Li$_2$S disappeared during the following charge processes. Similar behavior was also observed in subsequent cycles.

Figure 17:
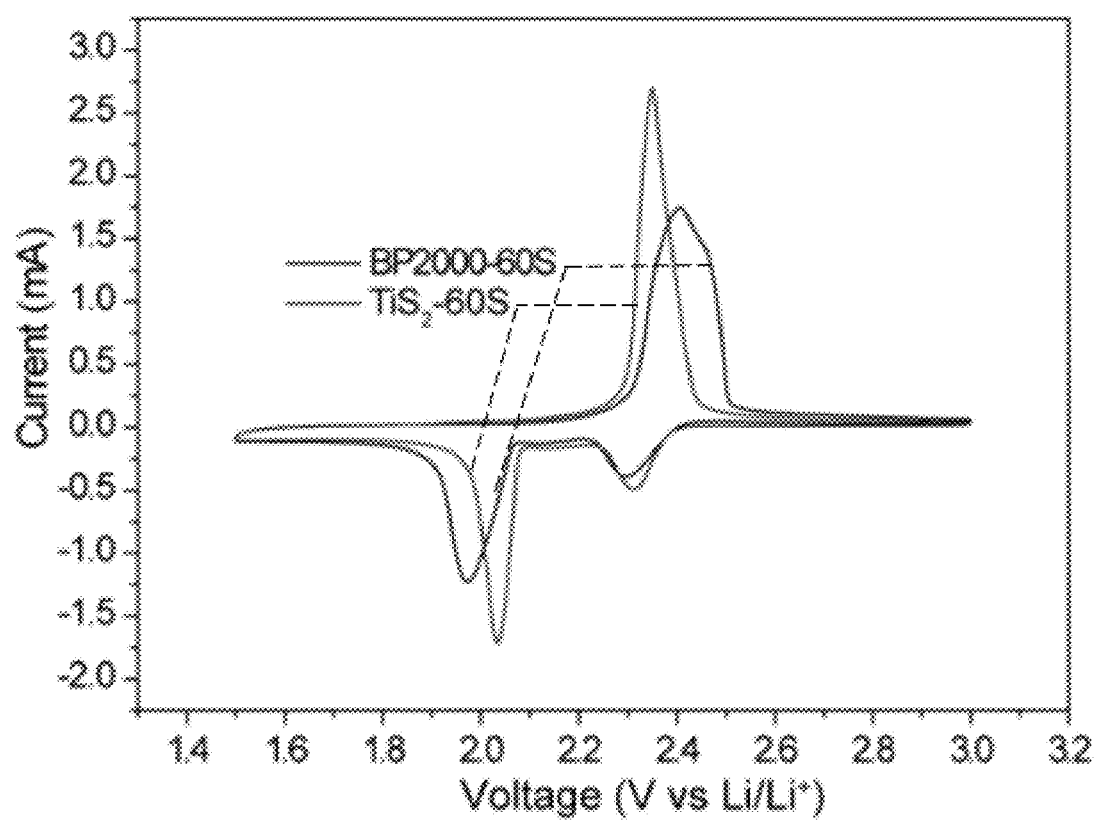
FIG. 17 depicts stable CV profiles of $TiS_2$-60S and BP2000-605 electrodes at a scanning rate of 0.1 mV $s^{-1}$ in coin cells.

Based on the in situ XRD and CV (FIG. 13) results, TiS$_2$ is partially lithiated initially, followed by the lithiation of sulfur to form LiPSs and the intercalation of Li' into Li$_x$TiS$_2$ (0<x≤1) which occur simultaneously during the discharge process. The Li$_2$S is oxidized in the subsequent charge process, while the host, LiTiS$_2$, is converted to Li$_x$T1S$_2$ (0<x<1). This indicates that the host TiS$_2$ cannot be observed after the initial state and is replaced by Li$_x$TiS$_2$ (0<x≤1) during cycling. Combined with the excellent electrochemical performance of TiS$_2$—S electrodes, the Li$_x$TiS$_2$ (0<X≤1), has a lower overpotential for the sulfur redox processes when compared to the carbon host (FIG. 17), in agreement with previous studies. Hence, it is Li$_x$TiS$_2$ (0<x≤1), rather than TiS$_2$, that effectively traps polysulfides and cat alytically decomposes Li$_2$S.

Figure 18:
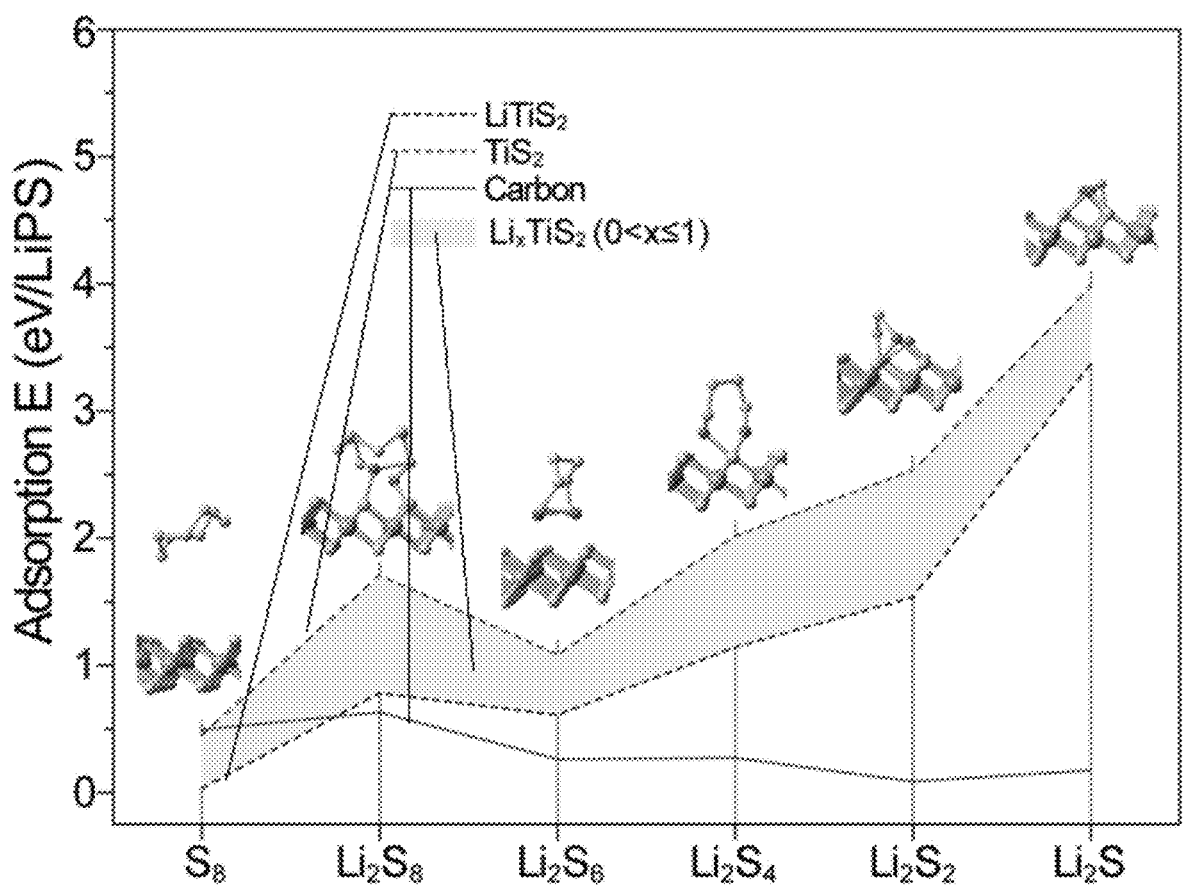
FIG. 18 shows adsorption binding energies for LiPSs on $TiS_2$, $LiTiS_2$ and carbon. Atomistic configurations for $S_8$, $Li_2S_8$, $Li_2S_6$, $Li_2S_4$, $Li_2S_2$ and $Li_2S$ adsorption on $TiS_2$ and $LiTiS_2$.

DFT calculations were performed to further understand the interactions between Li$_x$TiS$_2$ and LiPSs and to confirm that Li$_x$TiS$_2$ serves as an excellent anchoring medium to facilitate the Li—S redox reactions (FIG. 18). From the calculations, it was found that the LiPSs could adsorb strongly onto the Li$_x$TiS$_2$ surface with an adsorption energy of 0.6-4.0 eV/LiPS, which is significantly larger than that for a graphitic anchoring medium (0.1-0.5 eV/LiPS). The anchoring effect becomes stronger when the Li—S reaction approaches the fully discharged state, which is in good agreement with a previous study. LiPSs anchoring can be tuned by the Li ion concentration (x) in Li$_x$TiS$_2$. Changing the anchoring medium from TiS$_2$ to LiTiS$_2$ weakens the LiPSs anchoring energy by 0.5-0.9 eVLiPS as the reduction of the Ti cations (from Ti$^{4+}$ to Ti$^{3+}$) lowers the electrostatic force on Li ions for adsorbing LiPSs. But it is still sufficiently strong to provide a desirable anchoring.

In summary, we have shown that TiS$_2$ acts as a dynamic sulfur host, enabling high capacity and long cyclability for Li—S batteries. A TiS$_2$-60S electrode delivered a reversible capacity of about 1120 and 886 mAh g$^{-1}$ at 0.3 and 1.0 C, respectively, after 200 cycles, and a reversible capacity of 613 mAh g$^{-1}$ at 1.0 C after 1000 cycles. Cryo-STEM and XEDS elemental mapping indicated that the TiS$_2$—S composite contains micrometer sized elemental sulfur particles with a well-defined morphology, with no evidence of sulfur infiltration into the TiS$_2$ layers. In situ XRD studies revealed the dynamic nature of TiS$_2$ during the discharge/charge process. TiS$_2$ exhibits reversible insertionde-insertion of lithium ions to form Li$_x$TiS$_2$ (0<x≤1). It is Li$_x$TiS$_2$ (0<x≤1), rather than TiS$_2$, that plays a crucial role on the high capacity and superior stability of Li—S batteries. Furthermore, DFT calculations confirm the strong adsorption of polysulfides on Li$_x$TiS$_2$ (0<x≤1), which can mitigate the polysulfide shuttling and improve the cycling performance. A fundamental understanding of the lithiation/delithiation dynamics of TiS$_2$ and TiS$_2$—S electrodes can serve as a guide for designing better sulfur host materials for Li—S batteries.

The electrochemical performance data (including improved capacity retention) achieved with embodiments of the inventive cathode represent significant advances in the Li—S battery field.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), "contain" (and any form contain, such as "contains" and "containing"), and any other grammatical variant thereof, are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a composition or article that "comprises", "has", "includes" or "contains" one or more features possesses those one or more features, but is not limited to possessing only those one or more features.

As used herein, the terms "comprising," "has," "including," "containing," and other grammatical variants thereof encompass the terms "consisting of" and "consisting essentially of."

The phrase "consisting essentially of" or grammatical variants thereof when used herein are to be taken as specifying the stated features, integers, steps or components but do not preclude the addition of one or more additional features, integers, steps, components or groups thereof but only if the additional features, integers, steps, components or groups thereof do not materially alter the basic and novel characteristics of the claimed composition, device or method.

All publications cited in this specification are herein incorporated by reference as if each individual publication were specifically and individually indicated to be incorporated by reference herein as though fully set forth.

Subject matter incorporated by reference is not considered to be an alternative to any claim limitations, unless otherwise explicitly indicated.

Where one or more ranges are referred to throughout this specification, each range is intended to be a shorthand format for presenting information, where the range is understood to encompass each discrete point within the range as if the same were fully set forth herein.

While several aspects and embodiments of the present invention have been described and depicted herein, alternative aspects and embodiments may be affected by those skilled in the art to accomplish the same objectives. Accordingly, this disclosure and the appended claims are intended to cover all such further and alternative aspects and embodiments as fall within the true spirit and scope of the invention.

The invention claimed is:

1. A titanium disulfide-sulfur ($TiS_2$—S) composite particle comprising a titanium disulfide ($TiS_2$) substrate having solid elemental sulfur (S) disposed directly on a surface of the $TiS_2$, wherein the $TiS_2$ substrate has a layered crystalline hexagonal structure of space group P-3 ml and comprises at least 100 distinct layers, and wherein the $TiS_2$ and S are present in the composite in a weight ratio ($TiS_2$:S) of 20:80 to 50:50.

2. The $TiS_2$—S composite particle according to claim 1, wherein the sulfur is melt infused on the $TiS_2$ substrate.

3. The $TiS_2$—S composite particle according to claim 1, wherein the sulfur disposed directly on a surface of the $TiS_2$ is in the form of particles having an average particle size of 2 to 5 μm.

4. The $TiS_2$—S composite particle according to claim 1, wherein the composite particle is free of binder.

5. The $TiS_2$—S composite particle according to claim 1, wherein less than 1 wt % of elemental sulfur is infiltrated in the layers of $TiS_2$.

6. A plurality of $TiS_2$—S composite particles according to claim 1, wherein the particles have particle sizes in the range of 6 μm to 50 μm.

7. A plurality of $TiS_2$—S composite particles according to claim 6, having an average particle size of 6 μm to 40 μm.

8. A cathode comprising the $TiS_2$—S composite particle according to claim 1.

9. A cathode comprising a coating on a current collector, wherein the coating comprises:
(A) 60 to 80 wt % a plurality of $TiS_2$—S composite particles according to claim 1;
(B) 5 to 40 wt % carbon; and
(C) 2 to 20 wt % binder.

10. The cathode according to claim 9, wherein the coating comprises:
(A) 65 to 75 wt % of the plurality of $TiS_2$—S composite particles;
(B) 15 to 30 wt % carbon black; and
(C) 5 to 15 wt % binder.

11. The cathode according to claim 9, wherein the carbon is carbon black, and wherein binder comprises poly(acrylic acid).

12. The cathode according to claim 9, wherein the total weight percent of (A)+(B)+(C) is greater than or equal to 92 wt % of the total weight of the coating.

13. The cathode according to claim 9, wherein the cathode comprises, in addition to (A), (B), and (C), one or more additional constituents, provided that such one or more additional constituents sum less than 9 wt % of the total weight of the coating.

14. The cathode according to claim 9, wherein the specific capacity of the cathode is at least 800 mAh/g at a charge rate of 0.3 C.

15. The cathode according to claim 9, wherein the initial reversible capacity of the cathode at 0.5 C is at least 800 mAh $g^-$.

16. The cathode according to claim 9, wherein, after 300 cycles at 0.5 C, the cathode has a capacity retention of at least 80%.

17. The cathode according to claim 9, wherein the cathode has a capacity retention of at least 90% after 200 cycles at a charge rate of 0.3 C.

18. A lithium-sulfur battery comprising:
an anode;
a cathode according to claim 9; and
a separator,
wherein the separator is positioned between the anode and the cathode.

19. A process for manufacturing the cathode according to claim 9, comprising mixing the $TiS_2$—S composite particles, carbon black, and binder in solvent to form a slurry, applying the slurry to a current collector, and drying the slurry to form the coating, wherein the $TiS_2$—S composite particles are formed by melt infusing sulfur onto $TiS_2$ substrate particles.

20. The process according to claim 19, wherein the solvent comprises N-methyl-2-pyrrolidone.

* * * * *